United States Patent
Kondrad et al.

(10) Patent No.: US 10,625,646 B2
(45) Date of Patent: Apr. 21, 2020

(54) ARTICULATING MECHANICAL THIGH EXTENSION COMPOSITE TRIM PAYOUT LINKAGE SYSTEM

(71) Applicant: FORD GLOBAL TECHNOLOGIES, LLC, Dearborn, MI (US)

(72) Inventors: Marcos Silva Kondrad, Macomb Township, MI (US); Johnathan Andrew Line, Northville, MI (US); Kevin Wayne Preuss, Berkley, MI (US); S. M. Akbar Berry, Windsor (CA)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 224 days.

(21) Appl. No.: 15/834,202

(22) Filed: Dec. 7, 2017

(65) Prior Publication Data

US 2018/0099595 A1    Apr. 12, 2018

Related U.S. Application Data

(63) Continuation-in-part of application No. 15/096,374, filed on Apr. 12, 2016, now Pat. No. 10,081,279, and
(Continued)

(51) Int. Cl.
*B60N 2/62* (2006.01)
*B60N 2/02* (2006.01)
(Continued)

(52) U.S. Cl.
CPC ............. *B60N 2/62* (2013.01); *B60N 2/0232* (2013.01); *B60N 2/0284* (2013.01); *B60N 2/686* (2013.01);
(Continued)

(58) Field of Classification Search
CPC ...... B60N 2/62; B60N 2/0232; B60N 2/0284; B60N 2/686; B60N 2/929
(Continued)

(56) References Cited

U.S. PATENT DOCUMENTS

| 771,773 A | 10/1904 | Feely |
| 2,272,505 A | 2/1942 | Biggs |

(Continued)

FOREIGN PATENT DOCUMENTS

| DE | 102006061226 | 6/2008 |
| DE | 102012006074 | 11/2012 |

(Continued)

OTHER PUBLICATIONS

M. Grujicic et al., "Seat-cushion and soft-tissue material modeling and a finite element investigation of the seating comfort for passenger-vehicle occupants," Materials and Design 30 (2009) 4273-4285.
(Continued)

*Primary Examiner* — Anthony D Barfield
(74) *Attorney, Agent, or Firm* — David Coppiellie; Price Heneveld LLP

(57) ABSTRACT

A motor vehicle seating assembly comprises a seat frame, a cushion fixedly attached at a first end thereof to the seat frame, and a motor disposed on the seat frame and operably coupled with a displaceable second end of the cushion, wherein actuation of the motor operates the cushion between an extended position and a retracted position.

16 Claims, 15 Drawing Sheets

Related U.S. Application Data a continuation-in-part of application No. 15/096,364, filed on Apr. 12, 2016, now Pat. No. 10,046,681.

(60) Provisional application No. 62/549,975, filed on Aug. 25, 2017.

(51) Int. Cl.
*B60N 2/90* (2018.01)
*B60N 2/68* (2006.01)

(52) U.S. Cl.
CPC ...... *B60N 2/929* (2018.02); *B60N 2002/0236* (2013.01)

(58) Field of Classification Search
USPC .................................................. 297/284.11
See application file for complete search history.

(56) References Cited

U.S. PATENT DOCUMENTS

| | | |
|---|---|---|
| 2,661,050 A | 12/1953 | Felter |
| 2,725,921 A | 12/1955 | Markin |
| 2,958,369 A | 11/1960 | Pitts et al. |
| 3,403,938 A | 10/1968 | Cramer et al. |
| 3,512,605 A | 5/1970 | McCorkle |
| 3,550,953 A | 12/1970 | Neale |
| 3,833,257 A | 9/1974 | Dove |
| 3,880,462 A | 4/1975 | Mednick |
| 3,883,173 A | 5/1975 | Shephard et al. |
| 3,929,374 A | 12/1975 | Hogan et al. |
| 4,058,342 A | 11/1977 | Ettridge |
| 4,205,877 A | 6/1980 | Ettridge |
| 4,324,431 A | 4/1982 | Murphy et al. |
| 4,334,709 A | 6/1982 | Akiyama et al. |
| 4,353,595 A | 10/1982 | Kaneko et al. |
| 4,440,443 A | 4/1984 | Nordskog |
| 4,518,201 A | 5/1985 | Wahlmann et al. |
| 4,541,669 A | 9/1985 | Goldner |
| 4,609,221 A | 9/1986 | Bottcher |
| 4,616,874 A | 10/1986 | Pietsch et al. |
| 4,629,248 A | 12/1986 | Mawbey |
| 4,664,444 A | 5/1987 | Murphy |
| 4,720,141 A | 1/1988 | Sakamoto et al. |
| 4,752,982 A | 6/1988 | Jones et al. |
| 4,767,155 A | 8/1988 | Kousaka et al. |
| 4,915,447 A | 4/1990 | Shovar |
| 5,085,467 A | 2/1992 | Weingartner et al. |
| 5,104,189 A | 4/1992 | Hanai et al. |
| 5,108,150 A | 4/1992 | Stas et al. |
| 5,112,018 A | 5/1992 | Wahls |
| 5,145,232 A | 9/1992 | Dal Monte |
| 5,171,062 A | 12/1992 | Courtois |
| 5,174,526 A | 12/1992 | Kanigowski |
| 5,203,608 A | 4/1993 | Tame |
| 5,248,185 A | 9/1993 | Weingartner et al. |
| 5,364,164 A | 11/1994 | Kuranami |
| 5,370,443 A | 12/1994 | Maruyama |
| 5,518,294 A | 5/1996 | Ligon, Sr. et al. |
| 5,560,681 A | 10/1996 | Dixon et al. |
| 5,597,203 A | 1/1997 | Hubbard |
| 5,658,050 A | 5/1997 | Lorbiecki |
| 5,647,635 A | 7/1997 | Aumond et al. |
| 5,690,387 A | 11/1997 | Sarti |
| 5,692,802 A | 12/1997 | Aufrere et al. |
| 5,713,632 A | 2/1998 | Su |
| 5,755,493 A | 5/1998 | Kodaverdian |
| 5,758,924 A | 6/1998 | Vishey |
| 5,769,489 A | 6/1998 | Dellanno |
| 5,823,620 A | 10/1998 | Le Caz |
| 5,826,938 A | 10/1998 | Yanase et al. |
| 5,836,648 A | 11/1998 | Karschin et al. |
| 5,868,450 A | 2/1999 | Hashimoto |
| 5,902,014 A | 5/1999 | Dinkel et al. |
| 5,913,568 A | 6/1999 | Brightbill et al. |
| 5,951,039 A | 9/1999 | Severinski et al. |
| 5,979,985 A | 11/1999 | Bauer et al. |
| 6,024,406 A | 2/2000 | Charras et al. |
| 6,062,642 A | 5/2000 | Sinnhuber et al. |
| 6,079,781 A | 6/2000 | Tilley |
| 6,109,690 A | 8/2000 | Wu et al. |
| 6,145,925 A | 11/2000 | Eksin et al. |
| 6,155,593 A | 12/2000 | Kimura et al. |
| 6,179,379 B1 | 1/2001 | Andersson |
| 6,189,966 B1 | 2/2001 | Faust et al. |
| 6,196,627 B1 | 3/2001 | Faust et al. |
| 6,206,466 B1 | 3/2001 | Komatsu |
| 6,217,062 B1 | 4/2001 | Breyvogel et al. |
| 6,220,661 B1 | 4/2001 | Peterson |
| 6,224,150 B1 | 5/2001 | Eksin et al. |
| 6,296,308 B1 | 10/2001 | Cosentino et al. |
| 6,312,050 B1 | 11/2001 | Eklind |
| 6,357,827 B1 | 3/2002 | Brightbill et al. |
| 6,364,414 B1 | 4/2002 | Specht |
| 6,375,269 B1 | 4/2002 | Maeda et al. |
| 6,394,525 B1 | 5/2002 | Seibold |
| 6,394,546 B1 | 5/2002 | Knoblock et al. |
| 6,419,317 B1 | 7/2002 | Westrich et al. |
| 6,454,353 B1 | 9/2002 | Knaus |
| 6,523,892 B1 | 3/2003 | Kage et al. |
| 6,550,856 B1 | 4/2003 | Ganser et al. |
| 6,565,150 B2 | 5/2003 | Fischer et al. |
| 6,595,586 B2 | 7/2003 | Brightbill et al. |
| 6,619,605 B2 | 9/2003 | Lambert |
| 6,682,140 B2 | 1/2004 | Minuth et al. |
| 6,695,406 B2 | 2/2004 | Plant |
| 6,698,832 B2 | 3/2004 | Boudinot |
| 6,736,452 B2 | 5/2004 | Aoki et al. |
| 6,758,522 B2 | 7/2004 | Ligon, Sr. et al. |
| 6,808,230 B2 | 10/2004 | Buss et al. |
| 6,824,212 B2 | 11/2004 | Malsch et al. |
| 6,848,742 B1 | 2/2005 | Aoki et al. |
| 6,860,559 B2 | 3/2005 | Schuster, Sr. et al. |
| 6,860,564 B2 | 3/2005 | Reed et al. |
| 6,866,339 B2 | 3/2005 | Itoh |
| 6,869,140 B2 | 3/2005 | White et al. |
| 6,890,029 B2 | 5/2005 | Svantesson |
| 6,908,151 B2 | 6/2005 | Meeker et al. |
| 6,938,953 B2 | 9/2005 | Haland et al. |
| 6,955,399 B2 | 10/2005 | Hong |
| 6,962,392 B2 | 11/2005 | O'Connor |
| 6,988,770 B2 | 1/2006 | Witchie |
| 6,991,289 B2 | 1/2006 | House |
| 6,997,473 B2 | 2/2006 | Tanase et al. |
| 7,040,699 B2 | 5/2006 | Curran et al. |
| 7,100,992 B2 | 9/2006 | Bargheer et al. |
| 7,131,694 B1 | 11/2006 | Buffa |
| 7,140,682 B2 | 11/2006 | Jaeger et al. |
| 7,159,934 B2 | 1/2007 | Farquhar et al. |
| 7,159,938 B1 | 1/2007 | Shiraishi |
| 7,185,950 B2 | 3/2007 | Pettersson et al. |
| 7,192,087 B2 | 3/2007 | Adragna et al. |
| 7,213,876 B2 | 5/2007 | Stoewe |
| 7,216,915 B2 | 5/2007 | Kammerer et al. |
| 7,229,118 B2 | 6/2007 | Saberan et al. |
| 7,261,371 B2 | 8/2007 | Thunissen et al. |
| 7,344,169 B2 | 3/2008 | Reed et al. |
| 7,350,859 B2 | 4/2008 | Klukowski |
| 7,350,865 B2 | 4/2008 | Pearse |
| 7,393,005 B2 | 7/2008 | Inazu et al. |
| 7,425,034 B2 | 9/2008 | Bajic et al. |
| 7,441,838 B2 | 10/2008 | Patwardhan |
| 7,467,823 B2 | 12/2008 | Hadwich |
| 7,478,869 B2 | 1/2009 | Lazanja et al. |
| 7,481,489 B2 | 1/2009 | Demick |
| 7,506,924 B2 | 3/2009 | Bargheer et al. |
| 7,506,938 B2 | 3/2009 | Brennan et al. |
| 7,523,888 B2 | 4/2009 | Ferry et al. |
| 7,530,633 B2 | 5/2009 | Yokota et al. |
| 7,543,868 B1 | 6/2009 | Kuno |
| 7,578,552 B2 | 8/2009 | Bajic et al. |
| 7,578,554 B2 | 8/2009 | Lee et al. |
| 7,597,398 B2 | 10/2009 | Lindsay |
| 7,614,693 B2 | 11/2009 | Ito |

(56) References Cited

U.S. PATENT DOCUMENTS

| | | |
|---|---|---|
| 7,637,568 B2 | 12/2009 | Meeker et al. |
| 7,641,281 B2 | 1/2010 | Grimm |
| 7,668,329 B2 | 2/2010 | Matsuhashi |
| 7,669,925 B2 | 3/2010 | Beck et al. |
| 7,669,928 B2 | 3/2010 | Snyder |
| 7,669,929 B2 | 3/2010 | Simon et al. |
| 7,712,833 B2 | 5/2010 | Ueda |
| 7,717,459 B2 | 5/2010 | Bostrom et al. |
| 7,726,733 B2 | 6/2010 | Balser et al. |
| 7,735,932 B2 | 6/2010 | Lazanja et al. |
| 7,775,602 B2 | 6/2010 | Lazanja et al. |
| 7,752,720 B2 | 7/2010 | Smith |
| 7,753,451 B2 | 7/2010 | Maebert et al. |
| 7,784,863 B2 | 8/2010 | Fallen |
| 7,802,843 B2 | 9/2010 | Andersson et al. |
| 7,819,470 B2 | 10/2010 | Humer et al. |
| 7,819,474 B2 | 10/2010 | Gloriosa |
| 7,823,971 B2 | 11/2010 | Humer et al. |
| 7,845,729 B2 | 12/2010 | Yamada et al. |
| 7,857,381 B2 | 12/2010 | Humer et al. |
| 7,871,126 B2 | 1/2011 | Becker et al. |
| 7,891,701 B2 | 2/2011 | Tracht et al. |
| 7,909,360 B2 | 3/2011 | Marriott et al. |
| 7,931,294 B2 | 4/2011 | Okada et al. |
| 7,931,330 B2 | 4/2011 | Ito et al. |
| 7,946,649 B2 | 5/2011 | Galbreath et al. |
| 7,963,553 B2 | 6/2011 | Huynh et al. |
| 7,963,595 B2 | 6/2011 | Io et al. |
| 7,963,600 B2 | 6/2011 | Alexander et al. |
| 7,966,835 B2 | 6/2011 | Petrovski |
| 7,967,379 B2 | 6/2011 | Walters et al. |
| 7,971,931 B2 | 7/2011 | Lazanja et al. |
| 7,971,937 B2 | 7/2011 | Ishii et al. |
| 8,011,726 B2 | 9/2011 | Omori et al. |
| 8,013,655 B2 | 9/2011 | Ito et al. |
| 8,016,355 B2 | 9/2011 | Ito et al. |
| 8,029,055 B2 | 10/2011 | Hartlaub |
| 8,038,222 B2 | 10/2011 | Lein et al. |
| 8,075,053 B2 | 12/2011 | Tracht et al. |
| 8,109,569 B2 | 2/2012 | Mitchell |
| 8,123,246 B2 | 2/2012 | Gilbert et al. |
| 8,128,167 B2 | 3/2012 | Zhong et al. |
| 8,162,391 B2 | 4/2012 | Lazanja et al. |
| 8,162,397 B2 | 4/2012 | Booth et al. |
| 8,167,370 B2 | 5/2012 | Arakawa et al. |
| 8,210,568 B2 | 7/2012 | Ryden et al. |
| 8,210,605 B2 | 7/2012 | Hough et al. |
| 8,210,611 B2 | 7/2012 | Aldrich et al. |
| 8,226,165 B2 | 7/2012 | Mizoi |
| 8,231,174 B2 | 7/2012 | Yamada et al. |
| 8,297,708 B2 | 10/2012 | Mizobata et al. |
| 8,342,607 B2 | 1/2013 | Hofmann et al. |
| 8,408,646 B2 | 4/2013 | Harper et al. |
| 8,516,842 B2 | 8/2013 | Petrovski |
| 8,882,202 B2 | 11/2014 | Petzel et al. |
| 9,126,508 B2 | 9/2015 | Line et al. |
| 9,315,131 B2 | 4/2016 | Line et al. |
| 9,339,418 B2 | 5/2016 | Hamada |
| 9,566,888 B2 | 2/2017 | Kolich et al. |
| 9,573,502 B2 | 2/2017 | Seki et al. |
| 9,596,940 B2 | 3/2017 | Petzel et al. |
| 2002/0060493 A1 | 5/2002 | Nishino et al. |
| 2004/0195670 A1 | 10/2004 | Bohlender et al. |
| 2005/0200166 A1 | 9/2005 | Noh |
| 2006/0043777 A1 | 3/2006 | Friedman et al. |
| 2007/0120401 A1 | 5/2007 | Minuth et al. |
| 2007/0200398 A1 | 8/2007 | Wolas et al. |
| 2008/0157577 A1 | 7/2008 | Lindsay |
| 2008/0174159 A1 | 7/2008 | Kojima et al. |
| 2008/0231099 A1 | 9/2008 | Szczepkowski et al. |
| 2009/0039690 A1 | 2/2009 | Simon et al. |
| 2009/0066122 A1 | 3/2009 | Minuth et al. |
| 2009/0165263 A1 | 7/2009 | Smith |
| 2009/0302652 A1 | 12/2009 | Yamada et al. |
| 2009/0322124 A1 | 12/2009 | Barkow et al. |
| 2010/0026066 A1 | 2/2010 | Graber et al. |
| 2010/0038937 A1 | 2/2010 | Andersson et al. |
| 2010/0140986 A1 | 6/2010 | Sawada |
| 2010/0171346 A1 | 7/2010 | Laframboise et al. |
| 2010/0187881 A1 | 7/2010 | Fujita et al. |
| 2010/0201167 A1 | 8/2010 | Wieclawski |
| 2010/0231013 A1 | 9/2010 | Schlenker |
| 2010/0259081 A1 | 10/2010 | Kuno |
| 2010/0270840 A1 | 10/2010 | Tanaka et al. |
| 2010/0301650 A1 | 12/2010 | Hong |
| 2010/0320816 A1 | 12/2010 | Michalek |
| 2011/0018498 A1 | 1/2011 | Soar |
| 2011/0074185 A1 | 3/2011 | Nakaya et al. |
| 2011/0095513 A1 | 4/2011 | Tracht et al. |
| 2011/0095578 A1 | 4/2011 | Festag |
| 2011/0109128 A1 | 5/2011 | Axakov et al. |
| 2011/0109217 A1 | 5/2011 | Park et al. |
| 2011/0121624 A1 | 5/2011 | Brncick et al. |
| 2011/0133525 A1 | 6/2011 | Oota |
| 2011/0186560 A1 | 6/2011 | Kennedy et al. |
| 2011/0163574 A1 | 7/2011 | Tame et al. |
| 2011/0163583 A1 | 7/2011 | Zhong et al. |
| 2011/0187174 A1 | 8/2011 | Tscherbner |
| 2011/0254335 A1 | 10/2011 | Pradier et al. |
| 2011/0260506 A1 | 10/2011 | Kuno |
| 2011/0272548 A1 | 11/2011 | Rudkowski et al. |
| 2011/0272978 A1 | 11/2011 | Nitsuma |
| 2011/0278885 A1 | 11/2011 | Procter et al. |
| 2011/0278886 A1 | 11/2011 | Nitsuma |
| 2011/0298261 A1 | 12/2011 | Holt et al. |
| 2012/0007407 A1 | 1/2012 | Komamura et al. |
| 2012/0032486 A1 | 2/2012 | Baker et al. |
| 2012/0037754 A1 | 2/2012 | Kladde |
| 2012/0063081 A1 | 3/2012 | Grunwald |
| 2012/0080914 A1 | 4/2012 | Wang |
| 2012/0091695 A1 | 4/2012 | Richez et al. |
| 2012/0091766 A1 | 4/2012 | Yamaki et al. |
| 2012/0091779 A1 | 4/2012 | Chang et al. |
| 2012/0109468 A1 | 5/2012 | Baumann et al. |
| 2012/0119551 A1 | 5/2012 | Brncick et al. |
| 2012/0125959 A1 | 5/2012 | Kucera |
| 2012/0127643 A1 | 5/2012 | Mitchell |
| 2012/0129440 A1 | 5/2012 | Kitaguchi et al. |
| 2012/0162891 A1 | 6/2012 | Tranchina et al. |
| 2012/0175924 A1 | 7/2012 | Festag et al. |
| 2012/0187729 A1 | 7/2012 | Fukawatase et al. |
| 2012/0248833 A1 | 10/2012 | Hontz et al. |
| 2012/0261974 A1 | 10/2012 | Yoshizawa et al. |
| 2013/0076092 A1 | 3/2013 | Kilikarni et al. |
| 2013/0119741 A1 | 5/2013 | Medoro et al. |
| 2013/0285426 A1 | 10/2013 | Arant et al. |
| 2014/0203606 A1 | 7/2014 | Line et al. |
| 2014/0203610 A1 | 7/2014 | Line et al. |
| 2014/0203617 A1 | 7/2014 | Line et al. |
| 2014/0300167 A1 | 10/2014 | Datta |
| 2015/0061343 A1 | 3/2015 | Duncan et al. |
| 2015/0165935 A1 | 6/2015 | Sachs et al. |
| 2015/0245716 A1 | 9/2015 | Hwang |
| 2015/0258914 A1 | 9/2015 | Lee |
| 2015/0283931 A1 | 10/2015 | Line |
| 2016/0135602 A1 | 5/2016 | Smith |
| 2016/0207433 A1 | 7/2016 | Kondrad |
| 2016/0302577 A1 | 10/2016 | Mullen |
| 2016/0339820 A1* | 11/2016 | Kajino |

FOREIGN PATENT DOCUMENTS

| | | |
|---|---|---|
| EP | 627339 | 12/1994 |
| EP | 0670240 | 2/1995 |
| EP | 754590 | 1/1997 |
| EP | 0594526 B1 | 3/1997 |
| EP | 926969 | 1/2002 |
| EP | 1266794 | 3/2004 |
| EP | 1123834 | 10/2004 |
| EP | 1050429 | 10/2005 |
| EP | 1084901 | 6/2006 |
| EP | 1674333 | 8/2007 |
| EP | 1950085 | 12/2008 |
| EP | 1329356 | 11/2009 |

(56) References Cited

FOREIGN PATENT DOCUMENTS

| | | |
|---|---|---|
| EP | 2565070 | 3/2013 |
| JP | 2008189176 | 8/2008 |
| JP | 201178557 | 4/2011 |
| JP | 2011098588 | 5/2011 |
| JP | 2011251573 | 12/2011 |
| KR | 1020080066428 | 7/2008 |
| KR | 1020110051692 | 5/2011 |
| KR | 101180702 | 9/2012 |
| WO | 9511818 | 5/1995 |
| WO | 9958022 | 11/1999 |
| WO | 2006131189 | 12/2006 |
| WO | 2007028015 | 8/2007 |
| WO | 2008019981 | 2/2008 |
| WO | 2008073285 | 6/2008 |
| WO | 2010096307 | 8/2010 |
| WO | 2011021952 | 2/2011 |
| WO | 2012008904 | 1/2012 |

OTHER PUBLICATIONS

"Thigh Support for Tall Drivers," http://cars.about.com/od/infiniti/ig/2009-inifiniti-G37-Coupe-pics/2008-G37-cpe-thigh-support.htm (1 page).

Mladenov, "Opel Insignia Receives Seal of Approval for Ergonomic Seats," published Aug. 27, 2008, http://www.automobilesreview.com/auto-news/opel-insiania-receives-seal-of-approval-for-ergonomic-seats/4169/ (2 pages).

Brose India Automotive Systems, "Adaptive Sensor Controlled Headrest," http://www.indiamart.com/broseindiaautomotivesystems/products.html, Oct. 9, 2012 (12 pages).

ecoustics.com, "Cineak Motorized Articulating Headrest Preview," http://www.ecoustics.com/ah/reviews/furniture/accessories/cineak-motorized-headres, Oct. 9, 2012 (3 pages).

"Performance' Car Seat Eliminates Steel," published in Plastics News—Indian Edition Plastics & Polymer News, http://www.plasticsinformart.com/performance-car-seat-eliminates-steel/ Jan. 2012 (3 pages).

"Frankfurt 2009 Trend—Light and Layered," by Hannah Macmurray, published in GreeenCarDesign, http://www.greencarddesign.com/site/trends/00138-frankfurt-2009-trend-light-and-layered, Sep. 2009 (9 pages).

General Motors LLC, "2013 Chevrolet Spark Owner Manual," copyright 2012, 356 pages.

"Imola Pro-Fit," Cobra (http://cobra.subseports.com/products/cat/seats/brand/Cobra/prodID/656), date uknown, 2 pages.

* cited by examiner

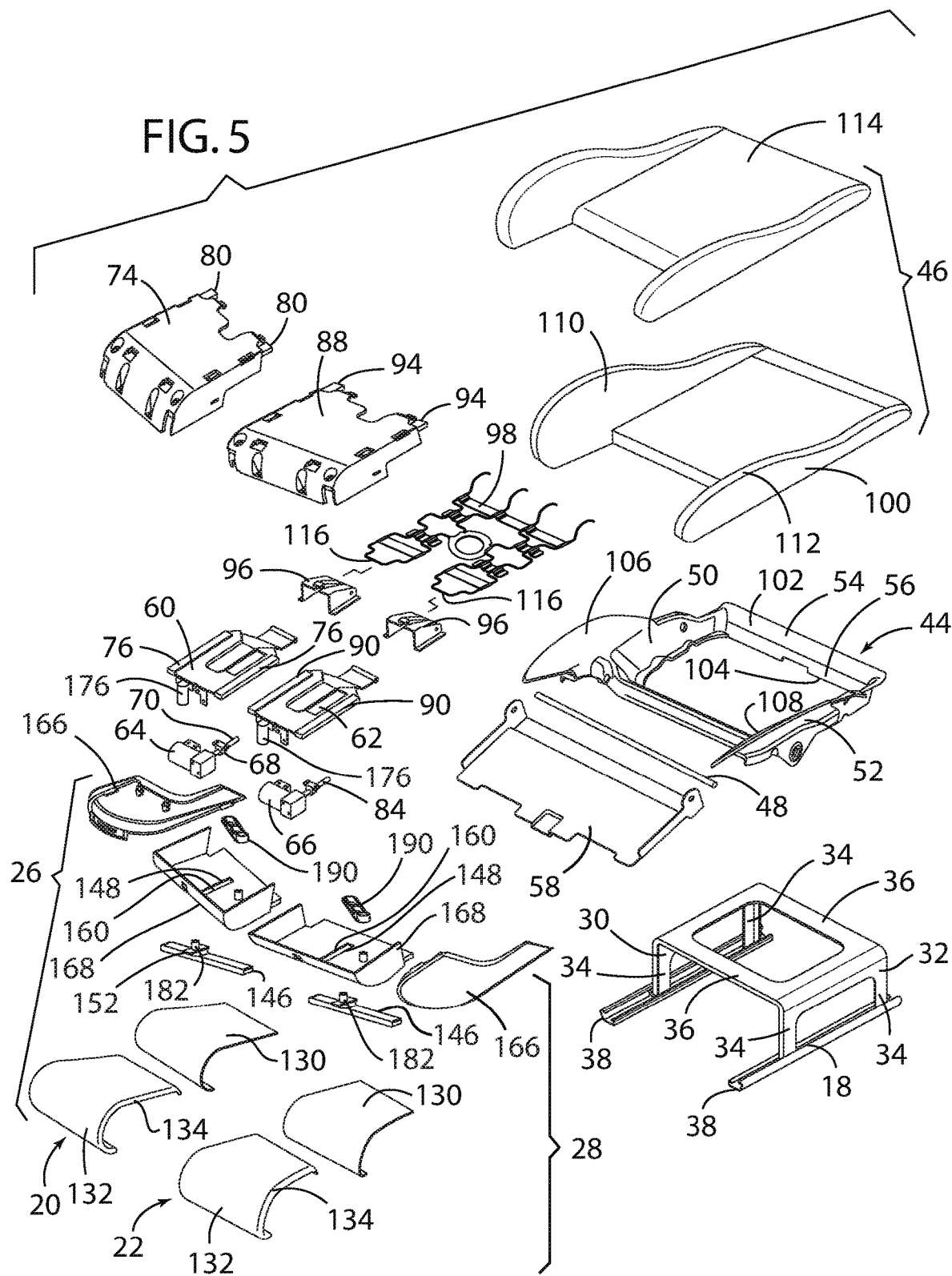

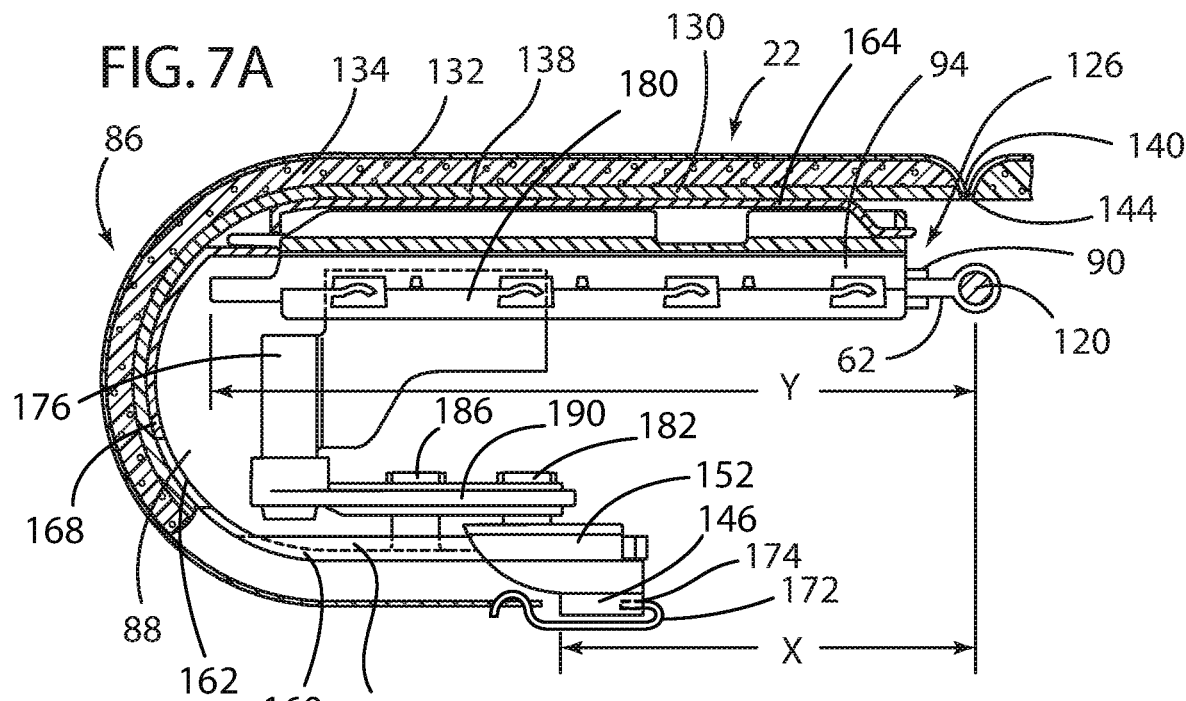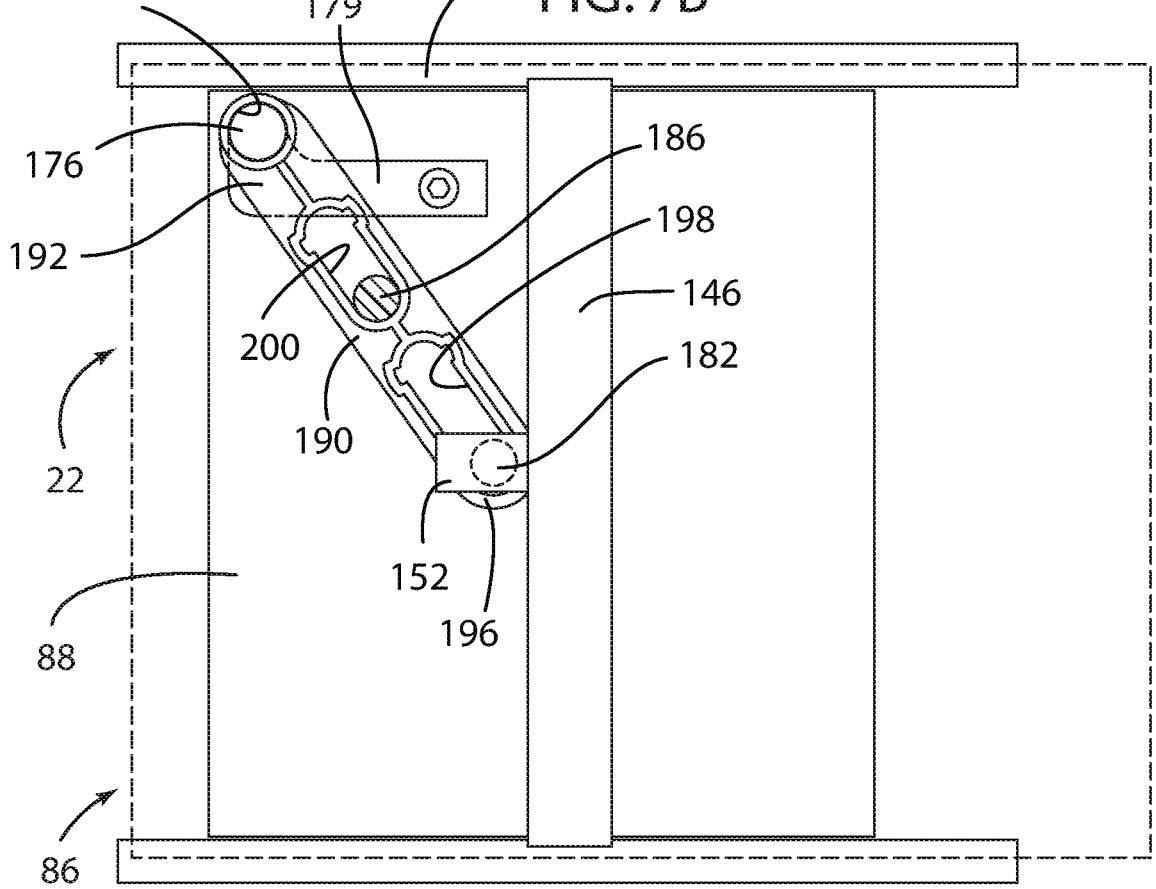

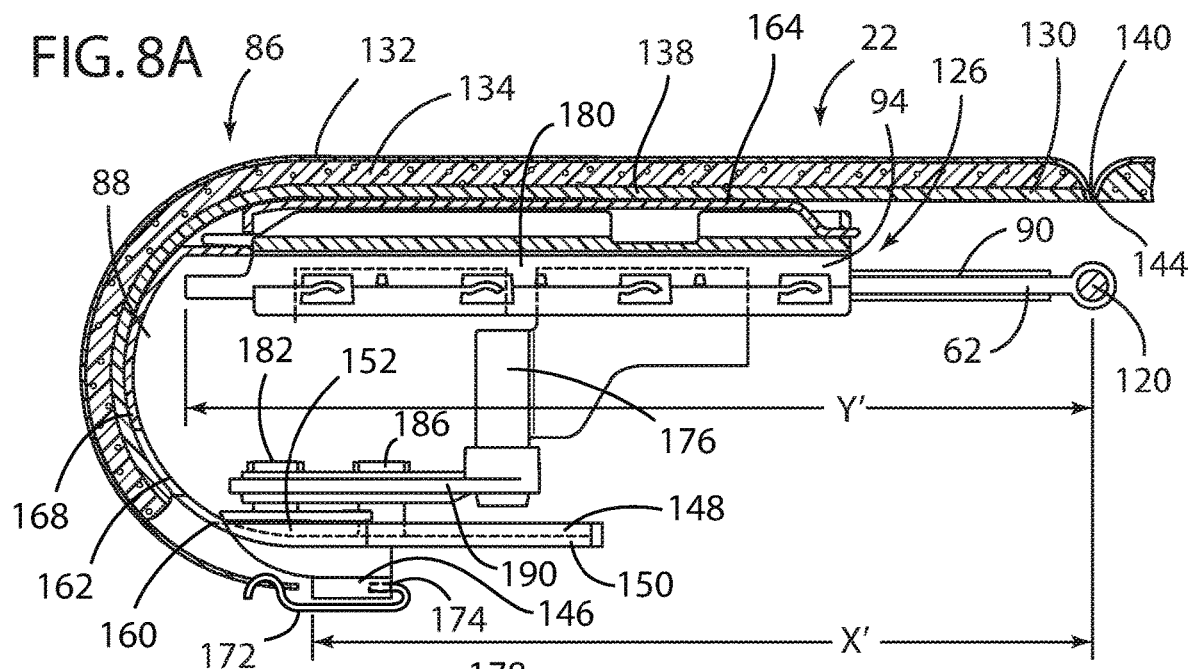
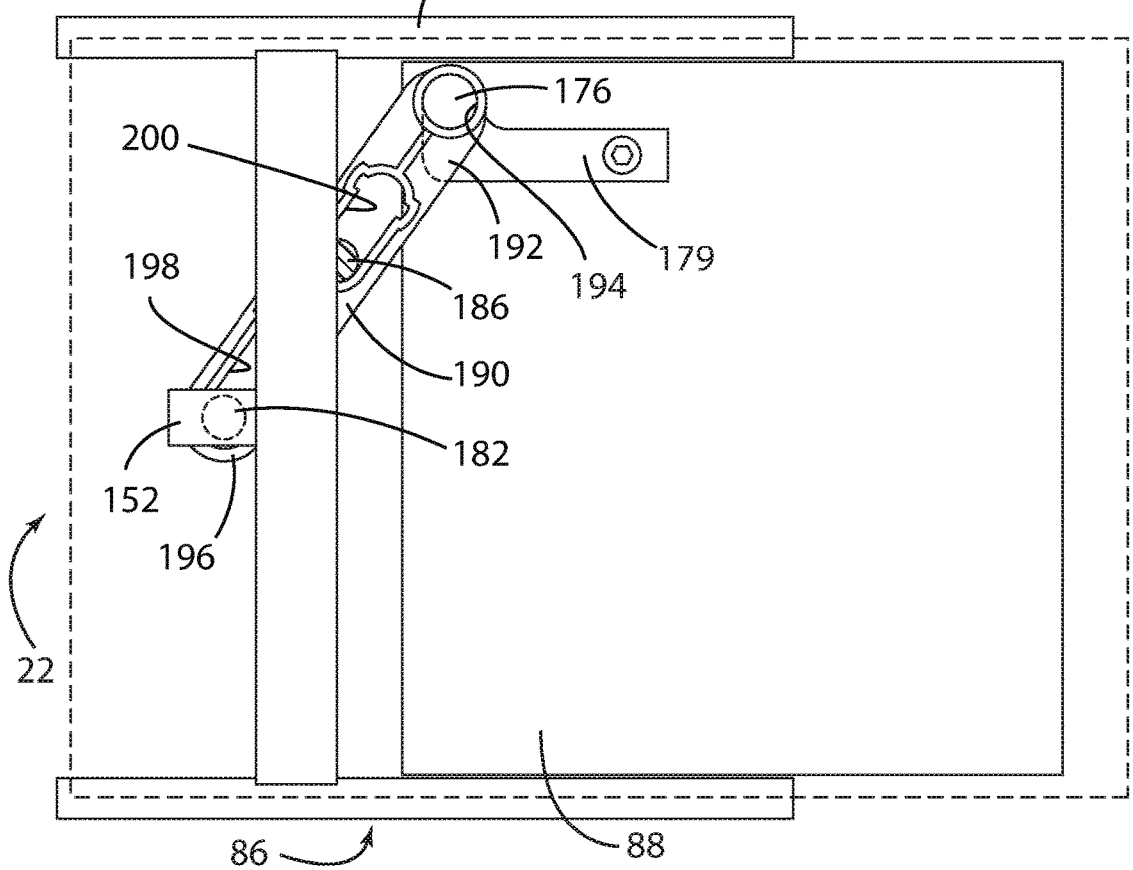

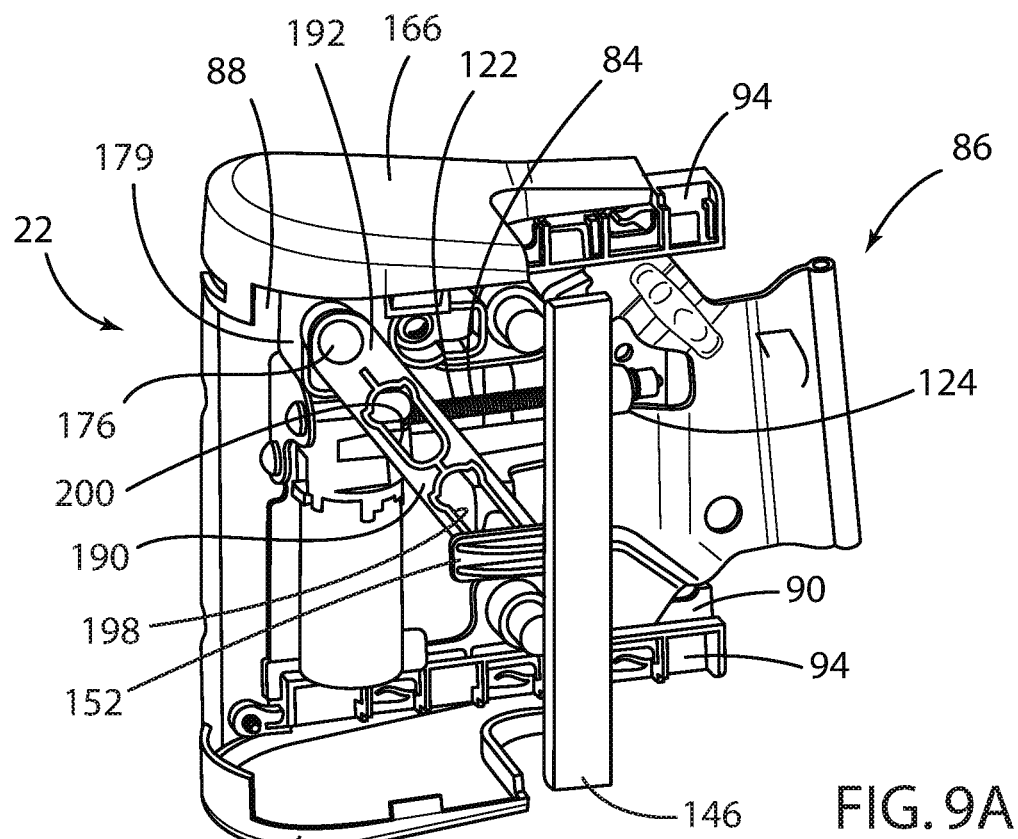
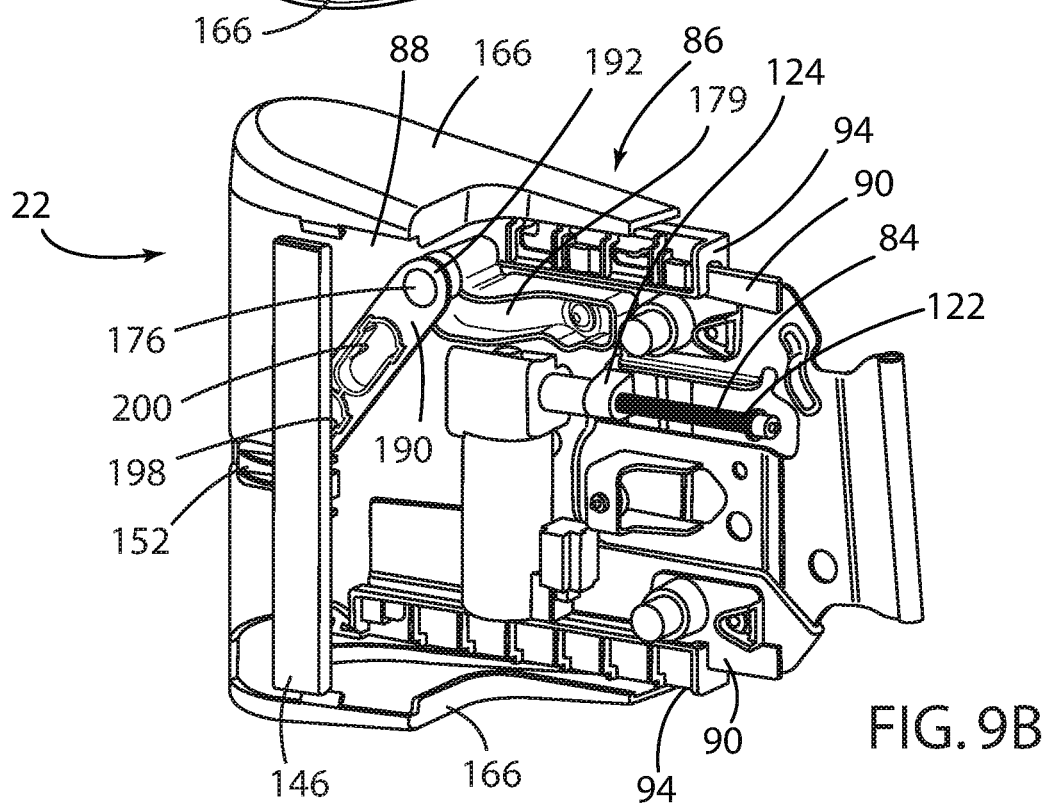

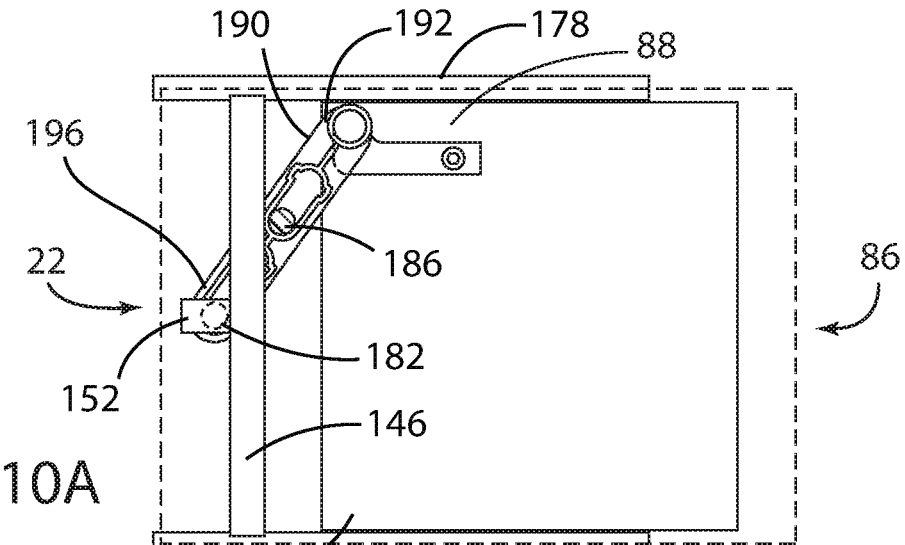
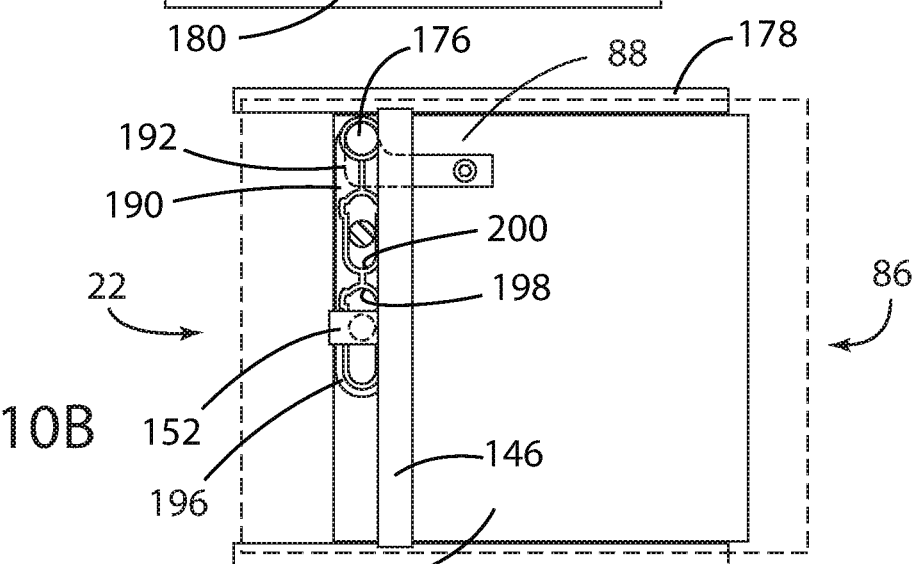
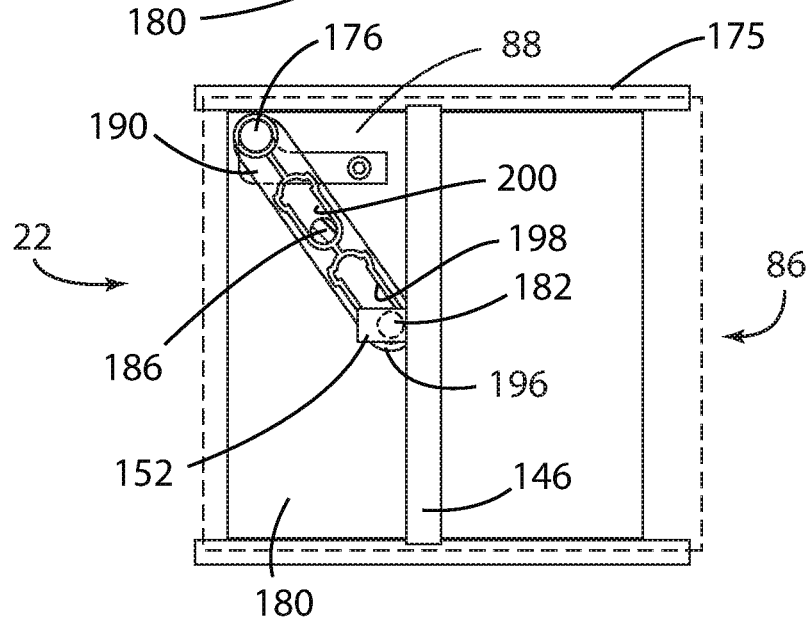

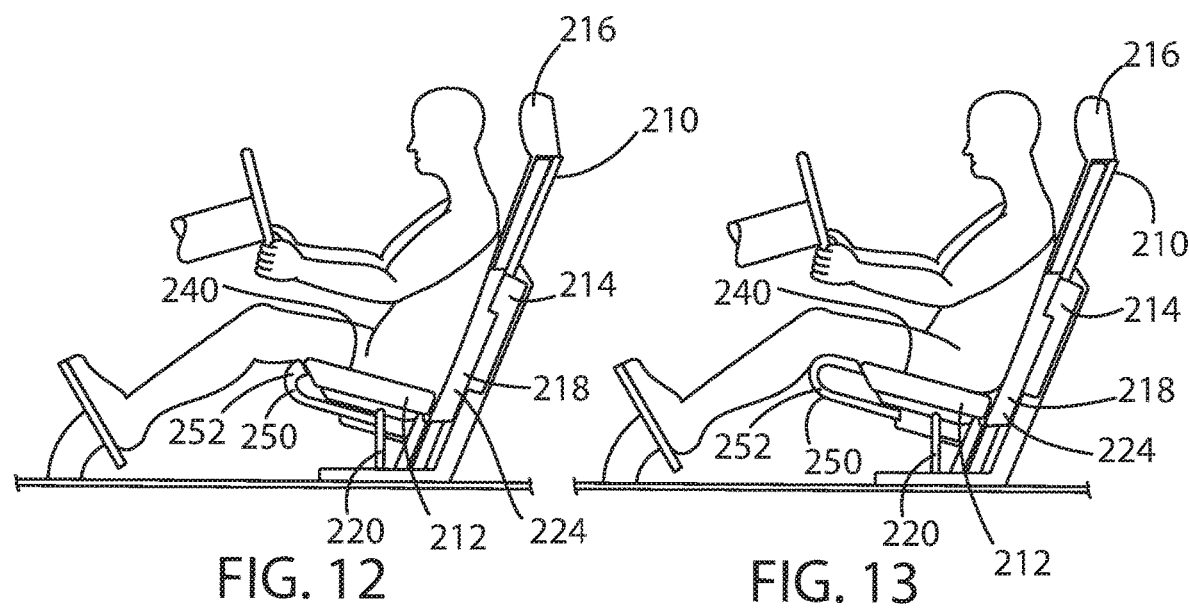

ARTICULATING MECHANICAL THIGH EXTENSION COMPOSITE TRIM PAYOUT LINKAGE SYSTEM

CROSS-REFERENCE TO RELATED APPLICATIONS AND CLAIM OF PRIORITY

This application claims priority under 35 U.S.C. § 119(e) to U.S. Provisional Application No. 62/549,972, filed Aug. 25, 2017, entitled "Cushion Nose Extender." This application is also a continuation-in-part of and claims priority under 35 U.S.C. § 120 to commonly assigned, and related U.S. patent application Ser. No. 15/096,364, filed Apr. 12, 2016, now U.S. Pat. No. 10,046,681, issued Aug. 14, 2018, entitled "Articulating Mechanical Thigh Extension Composite Trim Payout Linkage System," and is also a continuation-in-part of and claims priority under 35 U.S.C. § 120 to commonly assigned, and related U.S. patent application Ser. No. 15/096,374, filed Apr. 12, 2016, now U.S. Pat. No. 10,081,279, issued Sep. 25, 2018, entitled "Articulating Thigh Extension Trim Tensioning Slider Mechanism," each of which is hereby incorporated herein by reference in its entirety.

FIELD OF THE INVENTION

The present invention generally relates to a lower seat cushion for a motor vehicle seating assembly and, more particularly, to a motor vehicle seating assembly that includes a motor driven extendable and retractable integrated cushion nose for the lower seat cushion.

BACKGROUND OF THE INVENTION

Modern motor vehicle seats are becoming more and more comfortable as designers improve their understanding of human ergonomics, posture, and comfortability. Motor vehicle seating assemblies that include comfort components in the motor vehicle seatback and the motor vehicle lower seat can provide the driver and passengers with improved comfort and increased endurance for extensive vehicle rides. Additionally, various sizes and shapes of drivers and passengers can prove challenging when providing motor vehicle seating assemblies. Accordingly, aesthetically attractive motor vehicle seating assemblies that include components optimized to accommodate the different sizes and shapes of drivers and passengers, as well as the desired posture and sitting positions of those drivers and passengers, has become increasingly important. In particular, movement of the cushion nose forward and backward gives drivers and passengers control over how the lower seat cushion supports their legs and calves, leading to increased overall comfort.

SUMMARY OF THE INVENTION

According to one aspect of the present invention, a motor vehicle seating assembly comprises a seat frame, a cushion attached at a first end thereof to the seat frame, a rail operably coupled with a second end of the cushion and the seat frame, and a motor disposed on the seat frame and operably coupled with the second end of the cushion, wherein actuation of the motor operates the cushion between an extended position and a retracted position.

Embodiments of the first aspect of the invention can include any one or a combination of the following features:

A motor vehicle seating assembly comprising a seat frame, a flexible cushion fixedly attached at a first end thereof to the seat frame, and a motor disposed on the seat frame and operably coupled with a displaceable second end of the cushion, wherein actuation of the motor operates the cushion between an extended position and a retracted position.

The seat frame further comprises a seat base and a seat cushion base, the seat cushion base having an upper surface upon which a stationary padded seat is supported, and the first end of the cushion and a first end of the stationary padded seat are in juxtaposed and abutting relation as the cushion is operated between the extended and retracted positions.

A telescoping rail assembly operably coupled with the second end of the cushion and the seat frame, and a drive mechanism comprising a threaded spindle extending from and driven by the motor operably disposed on the seat frame, and a spindle nut threadingly receiving the threaded spindle and operably coupled with the second end of the cushion, whereby actuation of the motor rotates the threaded spindle to displace the spindle nut and the second end of the cushion between a first position corresponding with the extended position of the cushion and a second position corresponding with the retracted position of the cushion.

A motor, threaded spindle, and spindle nut disposed beneath the seat frame and hidden from view from a position at the same level or above the motor vehicle seating assembly.

A first slidable member operably coupled with the second end of the displaceable cushion and a second slidable member operably coupled to the first slidable member and operably coupled to a bottom surface of the seat frame, wherein the second slidable member is slidably disposed relative the first slidable member, wherein the seat frame comprises a seat base and a seat cushion base and the seat cushion base has an upper surface upon which a stationary padded seat is supported and the seat cushion base further comprises the bottom surface to which the second slidable member is operably coupled.

The first slidable member is fixedly attached to the second end of the cushion.

The second slidable member is fixedly attached to the bottom surface of the seat frame.

The first and second slidable members comprise a pair of telescoping rails.

The motor is fixedly attached to the seat frame.

The seat frame comprises a seat base and a seat cushion base.

The first end of the cushion is fixedly attached to a forward portion of the seat cushion base.

The seat base further comprise an enclosure having a back wall and a pair of lateral walls extending forward of and orthogonally to the back wall, and a pair of laterally displaced mounting ears disposed on an interior surface of each of the pair of lateral walls and projecting into an interior of the enclosure of the seat base, the seat cushion base further comprises a pair of laterally displaced attachment surfaces disposed on a bottom surface of the seat cushion base, wherein the seat cushion base is supported by the laterally displaced attachment surfaces, each of which is attached to one of the pair of laterally displaced mounting ears, and each of the pair of laterally displaced mounting ears and the laterally displaced attachment surfaces comprise aligned attachment holes for attachment of the seat cushion base to the seat base.

The seat base further comprises a lower wall by which the motor vehicle seating assembly is mounted to a motor vehicle structure.

The cushion further is comprised of a flexible material and has an outer surface comprised of trim cover stock.

The forward projecting edge of the cushion is substantially U-shaped in each of the extended and the retracted positions and all positions there between.

According to a further aspect of the present invention, a motor vehicle seating assembly comprises a seat frame, a cushion fixedly attached at a first end thereof to the seat frame, and a motor disposed on the seat frame and operably coupled with a displaceable second end of the cushion, wherein actuation of the motor operates the cushion between an extended position and a retracted position.

According to another aspect of the present invention, a motor vehicle seating assembly comprises a seat frame and a displaceable cushion having a first end operably coupled with a forward portion of the seat frame and a second end operably coupled with the seat frame, wherein the displaceable cushion is operable between an extended position and a retracted position. A first slidable member is operably coupled with the second end of the displaceable cushion, and a second slidable member operably coupled to the first slidable member and operably coupled to a bottom surface of the seat frame, wherein the first slidable member is slidably disposed relative the first slidable member. A motor is operably coupled with the second end of the displaceable cushion and the seat frame, and a drive mechanism operatively couples the motor with the second end of the displaceable cushion, wherein actuation of the motor operates the displaceable cushion between the extended and retracted positions.

According to a yet another aspect of the present disclosure, a motor vehicle seating assembly comprises a seat frame comprising a seat base and a seat cushion base, wherein the seat cushion base has an upper surface upon which a stationary padded seat is supported and the seat cushion base further comprises a bottom surface. A cushion is attached at a first end to the seat frame. A telescoping rail assembly is operably coupled with a second end of the cushion and the seat frame. A motor is disposed on the seat frame and is operably coupled with the second end of the cushion, wherein actuation of the motor operates the cushion between an extended position and a retracted position.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 5 is an perspective exploded view of the lower seat of the vehicle seating assembly of FIG. 2;

FIG. 7A is a partial side cross-sectional elevational view taken at line VIIA-VIIA of FIG. 4 illustrating the leg support in a retracted position;

FIG. 7B is a bottom view of the extendable member of the leg support of the lower seat of the vehicle seating assembly of the present invention illustrating the leg support in a retracted position;

FIG. 8A is a partial side cross-sectional elevational view taken at line VIIA-VIIA of FIG. 4 illustrating the leg supports in an extended position;

FIG. 8B is a bottom view of the extendable member of the leg support of the lower seat of the vehicle seating assembly of the present invention illustrating the leg supports in an extended position;

FIG. 9A is a bottom front perspective view of the extendable member of the leg support of the lower seat of the vehicle seating assembly of the present invention with the lower clamshell of the movable housing removed illustrating the leg supports in a retracted position;

FIG. 9B is a bottom rear perspective view of the extendable member of the leg support of the lower seat of the vehicle seating assembly of the present invention with the lower clamshell of the movable housing removed illustrating the leg supports in an extended position;

FIGS. 10A-C are a series of bottom views of the extendable member of the leg support of the lower seat of the vehicle seating assembly of the present invention illustrating the leg supports in the extended, partially retracted, and fully retracted positions;

FIG. 12 is a partial, cross-sectional side view of the motor vehicle seating assembly of FIG. 11, wherein the nose of the lower seat assembly cushion is in a retracted position;

FIG. 13 is partial, cross-sectional side view of the motor vehicle seating assembly of FIG. 11, wherein the nose of the lower seat assembly cushion is in an extended position;

DETAILED DESCRIPTION OF THE PREFERRED EMBODIMENTS

Figure 1:
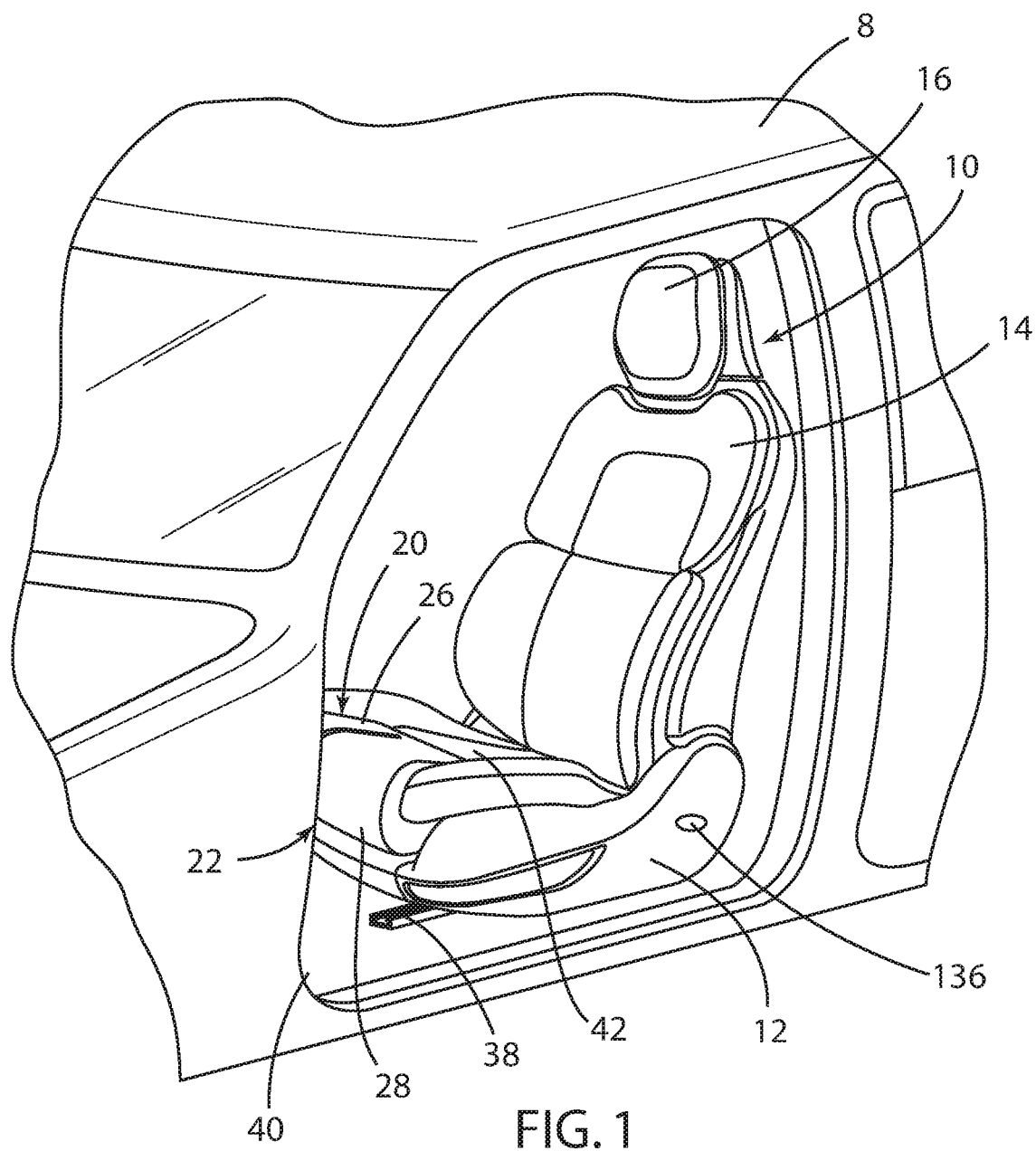
FIG. 1 is a perspective view of one embodiment of a vehicle seating assembly of the present invention disposed in a vehicle.

As referenced in the Figures, the same reference numerals may be used herein to refer to the same parameters and components or their similar modifications and alternatives. For purposes of description herein, the terms "upper," "lower," "right," "left," "rear," "front," "vertical," "horizontal," and derivatives thereof shall relate to the present disclosure as oriented in FIG. 1. However, it is to be understood that the present disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. The drawings referenced herein are schematic and associated views thereof are not necessarily drawn to scale.

Figure 2:
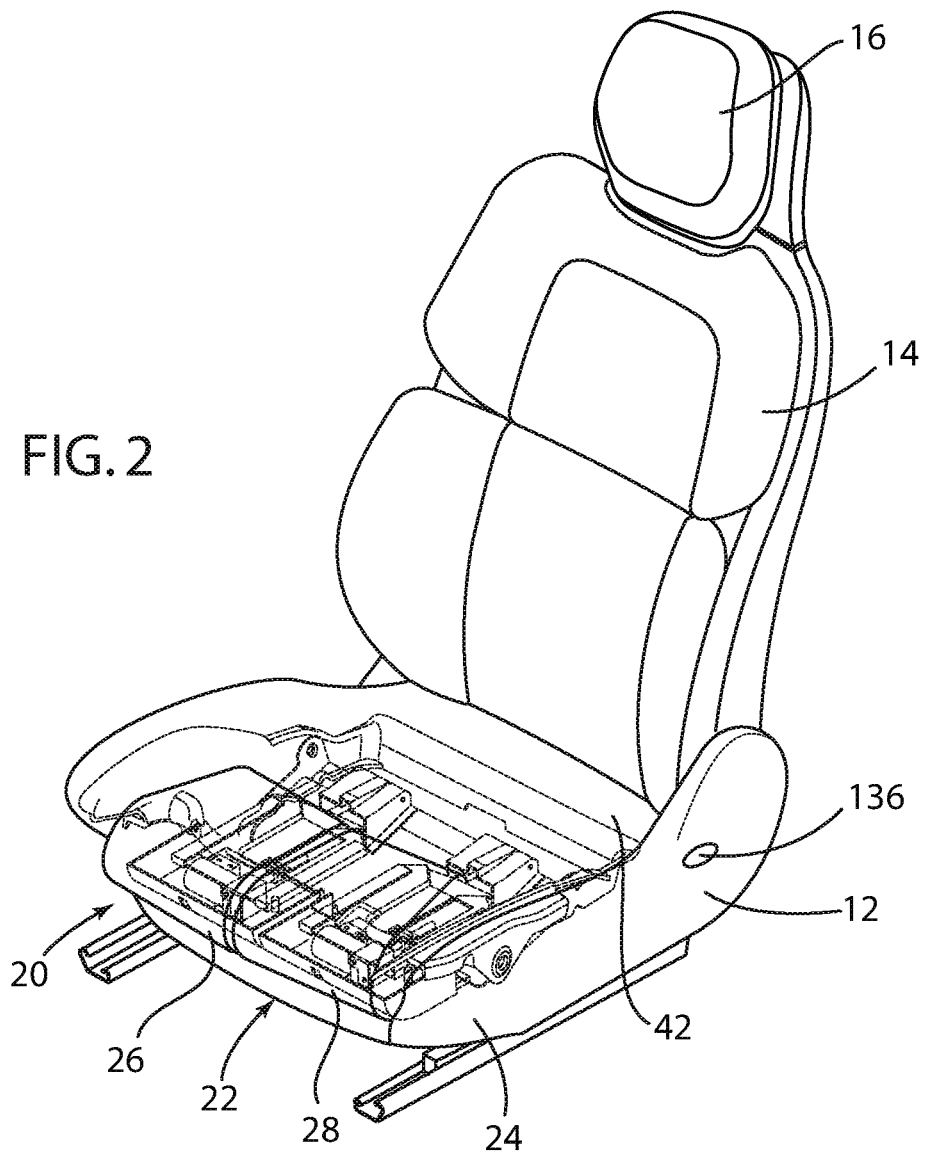
FIG. 2 is a perspective view of the vehicle seating assembly of FIG. 1.

Referring to FIGS. 1 and 2, reference numeral 10 generally designates a vehicle seating assembly for a vehicle 8 having a lower seat 12 and an upwardly extending seatback 14. The seatback 14 supports a headrest 16 thereon. The seatback 14 is pivotally coupled with the lower seat 12, such that the seatback 14 can be moved between upright and inclined positions. The headrest 16 is operably, and preferably slidably, coupled with the seatback 14 and also positioned in a variety of positions relative to the seatback 14 to support the head and neck of a driver or a passenger.

Referring again to FIGS. 1 and 2, the lower seat 12 includes a seat frame 18 to which a first and second leg support 20, 22 are pivotally coupled with a forward portion 24 of the lower seat 12. The first leg support 20 is preferably operable between raised and lowered positions. A first extendable member 26 is disposed beneath the first leg support 20 and is operable between an extended and a retracted position. The second leg support 22 is adjacent to and independent of the first leg support 20 and is likewise preferably pivotally coupled with the forward portion 24 of the seat frame 18, such that the second leg support 22 is operable between raised and lowered positions. A second extendable member 28 is likewise disposed beneath the second leg support 22 and is operable between extended and retracted positions.

The seat frame 18 includes first and second side members 30, 32 (FIG. 4) supported on legs 34 (FIG. 5). Laterally extending frame members 36 (FIG. 5) extend between the first and second side members 30, 32. The legs 34 are operably coupled with seat track slide assemblies 38 that are secured to a floor 40 of the vehicle 8.

Figure 3:
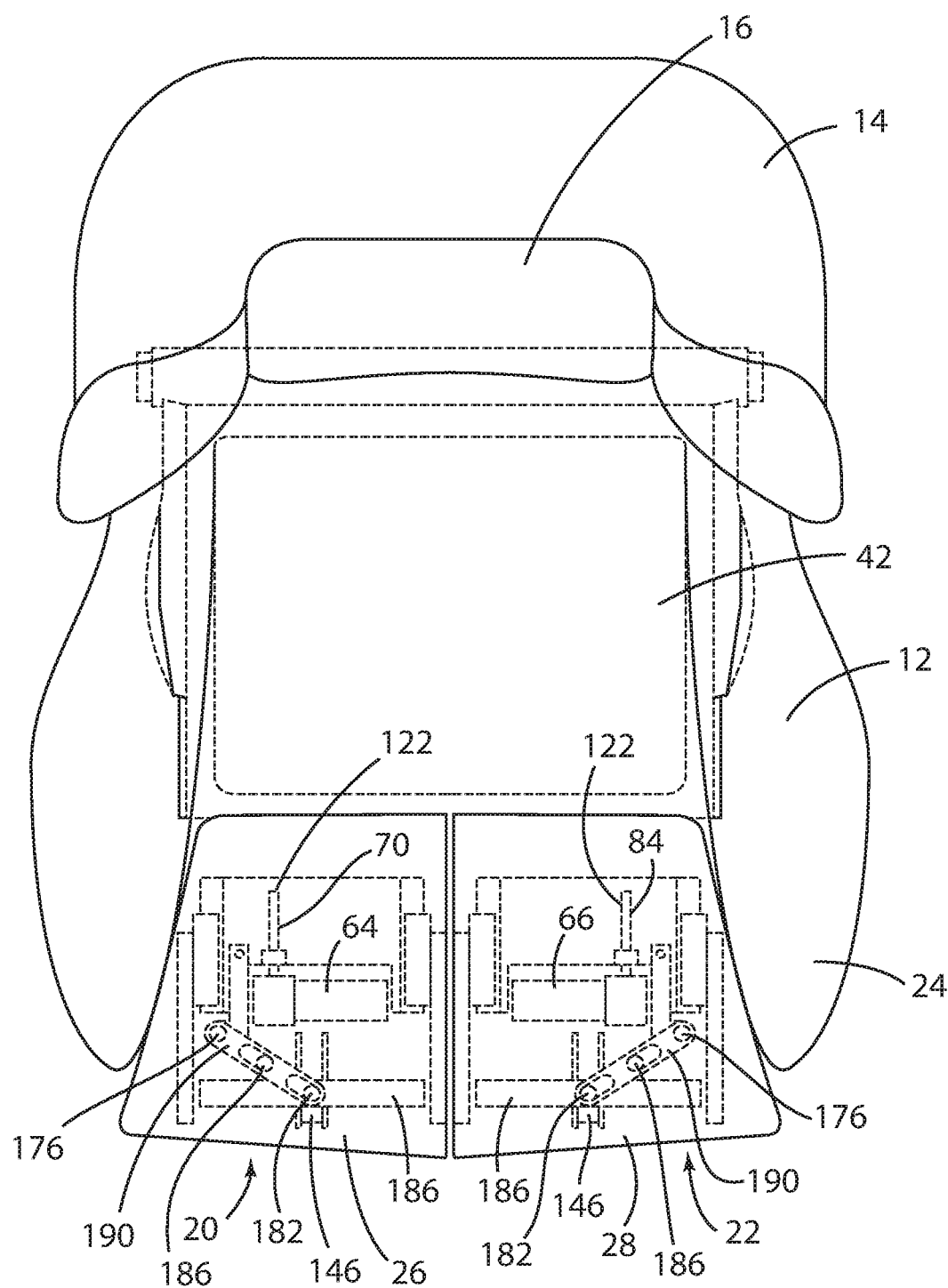
FIG. 3 is a top plan view of the vehicle seating assembly of FIG. 2.
Figure 4:
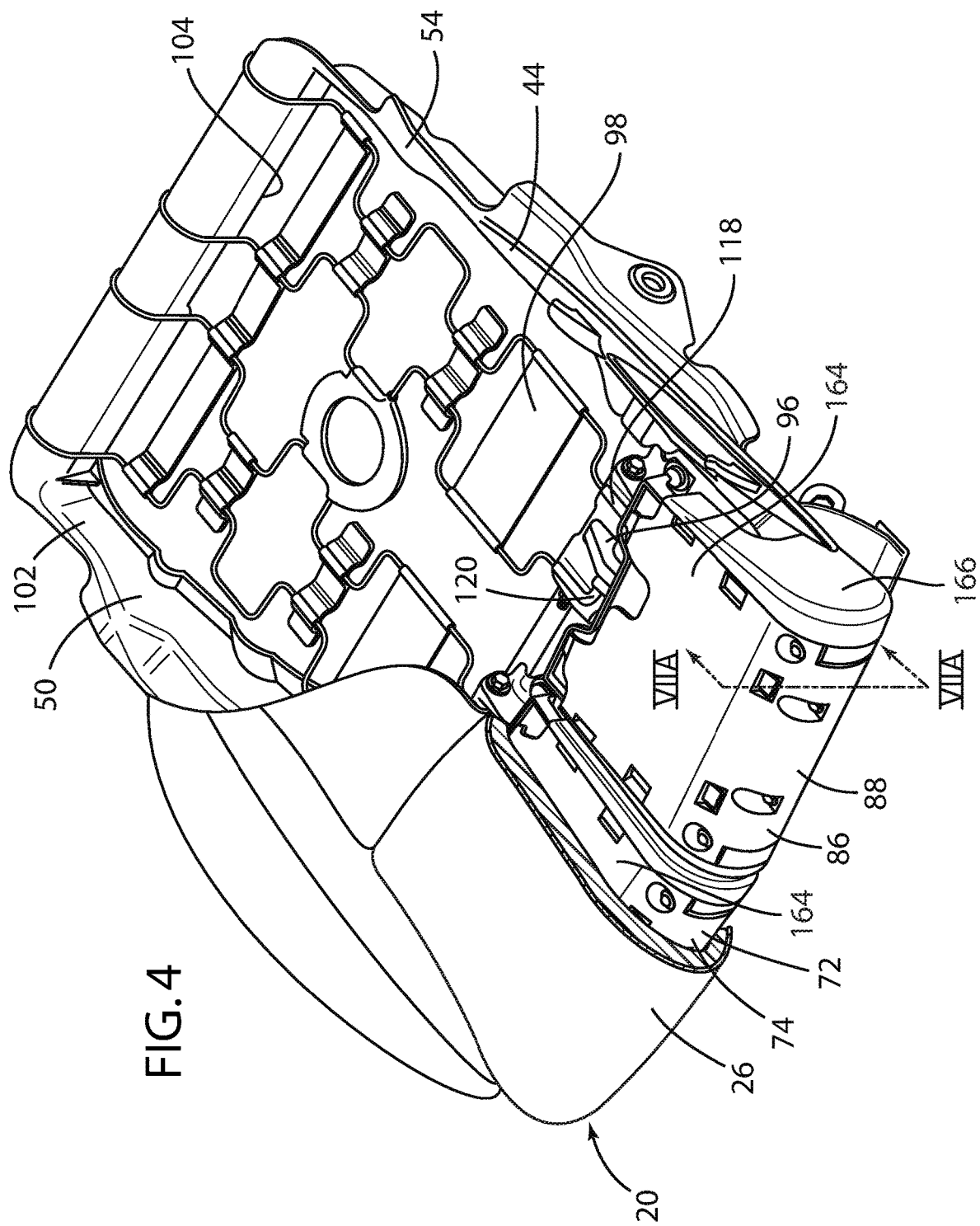
FIG. 4 is a perspective view of the cushion and interface member of the lower seat of the vehicle seating assembly of FIG. 3.

Referring now to FIGS. 3 and 4, the vehicle seating assembly 10 is generally configured to apply selective support to the underside of the legs of the driver or passenger. Specifically, as shown in FIG. 3, each leg of the driver or passenger can be independently supported by the first and second leg supports 20, 22. The first and second leg supports 20, 22 are movable between raised and lowered positions, as well as between extended and retracted positions to modify an effective seating area 42 of the vehicle seating assembly 10 and optimize accommodation of the size, shape, posture, and sitting positions of the driver or passenger.

As further shown in FIG. 3, the first extendable member 26 and the second extendable member 28 each extends forwardly from the seatback 14. The first extendable member 26 and the second extendable member 28 preferably extend forward at an angle laterally from a centerline and forwardly from an H-point to provide better leg support and comfort on the outside of the occupant's thighs in a position that naturally conforms to the natural leg-splay of a human occupant. This leg-splay angle is maintained in both the extended and retracted positions for optimized comfort in all positions. The angle is preferably between 5 and 10 degrees, and more preferably about 5 degrees, from the seat H-point along the centerline C of the lower seat 12. The split between the first extendable member 26 and the second extendable member 28 at such an angle $\alpha$ provides improved comfort that reduces muscle strain and improves leg and thigh support.

Referring now to FIG. 5, the vehicle seating assembly 10 includes an interface member 44 that is supported over the seat frame 18. The interface member 44 is positioned between the seat frame 18 and the upper portion 46 of the lower seat 12. The interface member 44 is disposed behind the first and second leg supports 20, 22 and in front of the seatback 14. The interface member 44 includes a pivot rod 48 that extends between first and second sides 50, 52 of the interface member 44. Additionally, a rear portion 54 of the interface member 44 includes a frame engagement component 56 that secures the interface member 44 to the seat frame 18. The pivot rod 48 is coupled with a pivotable base plate 58 situated beneath the first and second extendable members 26, 28.

As shown in FIG. 5, first and second support bases 60, 62 support the first and second leg supports 20, 22, respectively. The first and second support bases 60, 62 are operably coupled with first and second motors 64, 66, respectively. The first motor 64 is operably coupled with a drive shaft 70. The drive shaft 70 is capable of laterally translating a first support body 72 that includes a first movable housing 74 that is slidingly engaged by a pair of rails 76 mounted on each lateral side of the support base 60. A pair of slide tracks 80 mounted on the lateral side of the interior of the first movable housing 74 engages the rails 76 to allow the first movable housing 74 to slide forward and backwards relative to the first support base 60, as will be further discussed below, and between extended and retracted positions. Similarly, the second motor 66 is operably coupled with a drive shaft 84. The drive shaft 84 is capable of laterally translating a second support body 86 of the second leg support 22 between extended and retracted positions. The second support body 86 also includes a second movable housing 88 that is slidingly engaged by a pair of rails 90 mounted on each lateral side of the second support base 62. A pair of slide tracks 94 mounted on the lateral sides of the interior of the second movable housing 88 (see FIG. 6B) engages the rails 90 to allow the second movable housing 88 to slide forward and backwards relative to the second support base 62 between extended and retracted positions (see FIGS. 9A and 9B).

Referring again to FIG. 5, the interface member 44 includes suspension assembly 98 that supports a seat cushion 100. Preferably, the interface member 44 has a shape that largely complements the shape of the seat cushion 100. Specifically, the interface member 44 includes a body 102 defining an aperture 104 configured to receive the suspension assembly 98, which supports the seat cushion 100. At the same time, first and second wings 106, 108 extend from the body 102 and are configured to support first and second side cushions 110, 112 of the seat cushion 100. The seat cushion 100 is supported above the suspension assembly 98 and is protected by a cushion cover stock 114. It is anticipated that the cushion cover stock 114 could be any of a number of materials, including traditional fabrics, as well as leathers, vinyl, and fabric material. The laterally extending pivotable base plate 58 is positioned below the first and second leg supports 20, 22 and is coupled to the seat frame 18. The laterally extending pivotable base plate 58 assists in guiding the first and second leg supports 20, 22 between the various positions, and, at the same time, provides additional rigidity to the seat frame 18 of the vehicle seating assembly 10.

Referring now to FIGS. 6 and 7, the first and second leg supports 20, 22 will be discussed in further detail. The first and second leg supports 20, 22 are configured to engage the interface member 44 of the vehicle seating assembly 10. Specifically, the first and second support bases 60, 62 are pivotally coupled via bracket 96 with and pivot about the forward elements 118 of the suspension assembly 98 at pivot point 120, as shown in FIGS. 4 and 5. The first and second support bases 60, 62 are thus rotatably and fixedly coupled with the interface member 44 of the vehicle seating assembly 10.

In a preferred embodiment, the first and second support bases 60, 62 are operable between the raised and lowered positions about the pivot point 120. Preferably, each of the first and second support bases 60, 62 are biased to the raised position. It is generally contemplated that the support body 72 of the first leg support 20 and the support body 86 of the second leg support 22 may be movable to the raised position and the lowered position via an actuation assembly operably coupled with a motor (not shown). Alternatively, adjustment of the first and second leg supports 20, 22 may be made manually via a gear system, as understood by one having ordinary skill in the art.

In order to effect fore and aft motion of the first and second leg supports 20, 22, the first and second electric motors 64, 66 of the first and second leg supports 20, 22, respectively, are positioned on and affixed to the first and second support bases 60, 62. The first and second motors 64, 66 are operably coupled with the drive shafts 70, 84, respectively. Each drive shaft 70, 84 includes a screw gear 122 disposed thereon that engages a gear nut 124 disposed on and affixed to the interior of the first and second movable housing 74, 88. The screw gear 122 is thus mounted to first and second support bases 60, 62 and is rotatably engaged with the gear nut 124 disposed on each of the first and second movable housings 74, 88, which allows for linear translation of the first and second leg supports 20, 22 between the extended and retracted positions, as discussed below.

Referring again to FIGS. 7 and 8, each of the first and second leg supports 20, 22 includes a slide assembly 126 comprising the aforementioned rails 76, 90 mounted on the first and second support bases 60, 62 and the slide tracks 80, 94 mounted within the first and second movable housings 74, 88. The tracks 80, 94 of the support bodies 72, 86 of the first and second leg supports 20, 22 are configured to receive the rails 76, 90 mounted on the first and second support bases 60, 62. The support bodies 72, 86 are thereby configured to engage the slide assembly 126.

The gear nut 124, as noted above, is mounted to an interior surface of each of the first and second movable housings 74, 88 (as shown in FIGS. 9A and 9B) and is linearly translatable via the screw gear 122 between fore and aft positions. As described in further detail below, when the gear nut 124 is in the aft position, the relevant leg support 20 or 22 is in the retracted position. Similarly, when the gear nut 124 is in the forward position, the relevant leg support 20 or 22 is in the extended position. The first and second extendable members 26, 28 are thereby operatively coupled with the forward portion 24 of the lower seat 12.

Referring again to FIGS. 7 and 8, a protective wrap 130 is disposed about an upper, lower, and forward portion of each support body 72, 86. The protective wrap 130 is itself covered by a leg support trim cover stock 132 over a cushion layer 134, the cushion layer 134 being disposed between the trim cover stock 132 and protective wrap 130. The leg support cover stock 132 and the cushion layer 134 thereby conceal the protective wrap 130.

Referring now to FIGS. 7A and 7B, the vehicle seating assembly 10 is illustrated with the second leg support 22 moved to an initial position. In the initial position, the second leg support 22 is in the retracted position. In this initial position, the effective seating area 42 of the lower seat 12 has not been enlarged. Accordingly, the effective seating area 42 is generally configured to support a driver or passenger that is smaller in stature. In the event the driver or passenger has a larger stature and wishes to change the effective seating area 42 of the vehicle seating assembly 10, then the first and second leg supports 20, 22 can be extended independently, preferably at an optimized lateral angle α of between 5 to 10 degrees relative the centerline C.

Referring now to FIGS. 8A and 8B, in the illustrated embodiment, the second leg support 22 has been translated to the extended position. To move the second leg support 22 to the extended position, the driver or passenger would simply engage a toggle switch 136 on the lower seat 12 that is operably coupled to the second motor 66. The second motor 66 then activates, which turns the drive shaft 84 that is coupled with the screw gear 122. Notwithstanding the foregoing, it is contemplated that the benefits of the present disclosure may also be obtained in a manual system that does not employ motor 64, 66, but rather relies upon manual rotational input, as is known in the art.

As shown in FIGS. 9A and 9B, as the screw gear 122 rotates, the gear nut 124 attached to the second movable housing 88 begins to move relative to the screw gear 122. Specifically, when the second motor 66 operates in a first direction, the screw gear 122 rotates such that threads of the screw gear 122 push internal threads of the gear nut 124, which translates the gear nut 124 and the second leg support 22 away from the interface member 44 (corresponding to the extended position of the second leg support 22). When the second motor 66 operates in a second direction, the screw gear 122 turns in a second direction opposite the first direction, such that the gear nut 124 is drawn toward the interface member 44 (corresponding with the retracted position of the second leg support 22).

As the screw gear 122 rotates in the first direction, the support body 86 of the second leg support 22 is pushed outwardly away from the interface member 44. At the same time, the second support base 62 maintains position and does not move. As the gear nut 124 is rigidly mounted to the interior surface 188 of the second movable housing 88, the second leg support 22 is moved forward relative the first support base 60. Thus, the interaction of the rail 90 with the tracks 94 allows for the second leg support 22 to extend relative to the first leg support 20.

Although the electrical motor 66 is preferably disclosed as being mounted on the second support base 62 and the driven gear nut 124 is mounted on the interior surface of the second movable housing 88, the components can be reversed. That is, the motor 66 may be mounted on the second movable housing 88, and the driven gear nut 124 may be mounted on the second support base 62. In the event the driver or passenger also wanted the first leg support 20 to be moved to the extended position, the driver or passenger could engage in the same behavior to actuate the first motor 64, which would then force the support body 72 of the first leg support 20 outward in a similar fashion to that described above with reference to the second leg support 22.

A beneficial feature of the present disclosure is that as the first and second movable housing 74, 88 extend forwardly beneath the protective wrap 130, cushion layer 134, and cover stock 132 of the leg supports 20, 22, the cover stock 132, cushion layer 134, and protective wrap 130 immediately beneath the occupant's thigh does not move. The cover stock 132 and cushion cover stock 114 also form a substantially smooth surface that does not collect debris throughout the motion of the extendable members 26, 28. That is, the cover stock 132 for the leg supports 20, 22, which forms a substantially rectangular panel, is at least partially disposed above an upper surface 138 of each of the first and second movable housings 74, 88 and is at least partially disposed below each of the first and second movable housings 74, 88.

Each cover stock 132 for the leg supports 20, 22 has a first fixed upper edge 140 and a second movable lower edge 142. The first fixed upper edge 140 of the cover stock 132 is fixedly attached to the cushion cover stock 114 over the cushion to form a continuous uninterrupted lateral seam or bite 144 between the first fixed upper edge 140 of the cover stock 132 and the cushion cover stock 114. The second movable lower edge 142 of the cover stock 132, located beneath each of the first and second leg supports 20, 22, is fixedly attached to an attachment member 146, which operates to maintain tension in the cover stock 132 of the leg supports 20, 22 during the extension and retraction operation.

The attachment member 146 is part of an articulating system that uniquely maintains the aforementioned tension in the cover stock 132 of the leg supports 20, 22. Each of the movable housings 74, 88 is provided with an articulating mechanical linkage system operatively coupling the movable housing 74, 88 to the second movable lower edge 142 of the trim cover stock 132 to maintain tension on the trim cover stock 132 as either of the first and second extendable members 26, 28 is operated between the extended and retracted positions. Each of the movable housings 74, 88 of the first and second extendable members 26, 28 further comprises an integrated track 148 disposed on a lower surface 150 of the movable housing 74, 88, and a trim payout slider 152 operably coupled with the integrated track 148 and adapted for fore and aft motion therein. The trim payout attachment member 146 is also operably coupled with the trim payout slider 152.

As the integrated track 148 is disposed on the lower surface 150 of the movable housing 74, 88, the trim payout slider 152 is effectively concealed from view and is relatively free from interference in its operation. The trim payout slider 152 is operably coupled with the integrated track 148 and adapted for fore and aft motion therein, and the trim payout attachment member 146 is operably coupled with the second movable lower edge 142 of the trim cover stock 132 and is operably coupled with the trim payout slider 152. The trim payout slider 152 is thus operably coupled with the second movable lower edge 142 of the cover stock 132 via the trim payout attachment member 146, and is thus capable of moving the second movable lower edge 142 of the cover stock 132, as discussed further below.

Figure 6A:
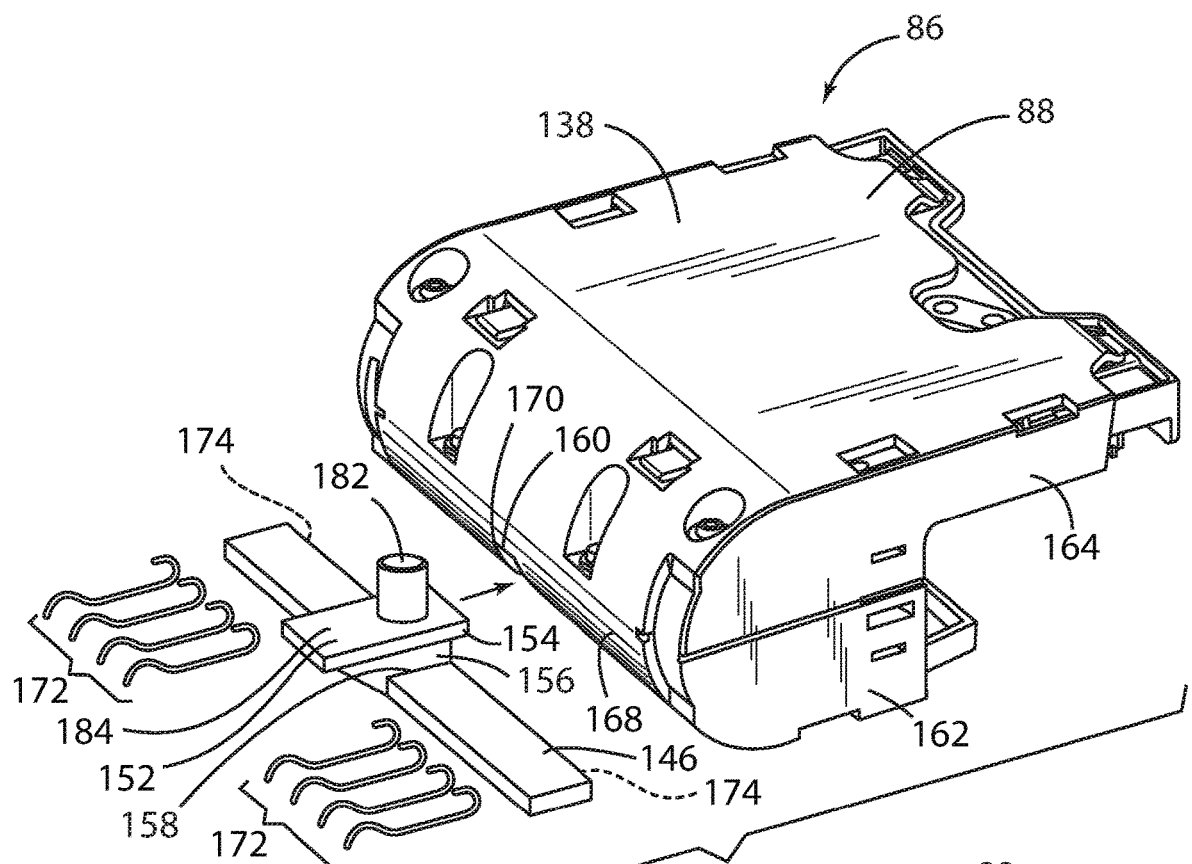
FIG. 6A is a perspective front and side view of the movable housing of the extendable member of the leg supports of the lower seat of the vehicle seating assembly of FIG. 2.

The trim payout slider 152 preferably has a pair of outwardly extending and opposing shoulders 154 above a central body 156 and a lower rail 158. Preferably, the lower rail 158 is integral with the trim payout attachment member 146 coupled with the trim payout slider 152, as shown in FIG. 6A. The longitudinal integrated track 148 preferably comprises a longitudinal slot 160 on the lower surface 150 of the movable housing 74, 88 that receives the central body 156 of the trim payout slider 152, the longitudinal slot 160 having a lateral width less than the lateral width of each of the outwardly extending and opposing shoulders 154 and the lower rail 158, whereby the trim payout slider 152 is retained in the longitudinal slot 160.

The movable housings 74, 88 include mating lower and upper clamshells 162, 164 and a pair of lateral endcaps 166 to form therein a cavity within which the tracks 94 are received and mounted, the tracks 80, 94 disposed on each interior side each engage one of the slide rails 76, 90 of the support bases 60, 62 and upon which either of the first and second extendable members 26, 28 slides between the extended and retracted positions. A partially forward facing surface 168 of the lower clamshell 162 of the movable housings 74, 88 has a forward facing opening 170 that is continuous with the longitudinal slot 160. The opening 170 has at least a portion of its lateral width greater than the lateral width of the outwardly extending and opposing shoulders 154 of the trim payout slider 152, whereby during assembly, the trim payout slider 152 may be inserted into the longitudinal slot 160 through forward facing opening 170 and thereby be adapted for slidable motion within the longitudinal slot 160.

The second moveable lower edge 142 of the trim cover stock 132 may be attached along the width of the trim payout attachment member 146 via a number of different methods, of which those skilled in the art will be aware. Preferably, a plurality of retainers 172 are passed through the second moveable lower edge 142 of the cover stock 132 and are placed in regularly spaced intervals within openings 174 across the lateral width of the cover stock 132, so as to securely grasp the second moveable lower edge 142 of the cover stock 132 along its entire width and maintain an even tension along the same.

Figure 6B:
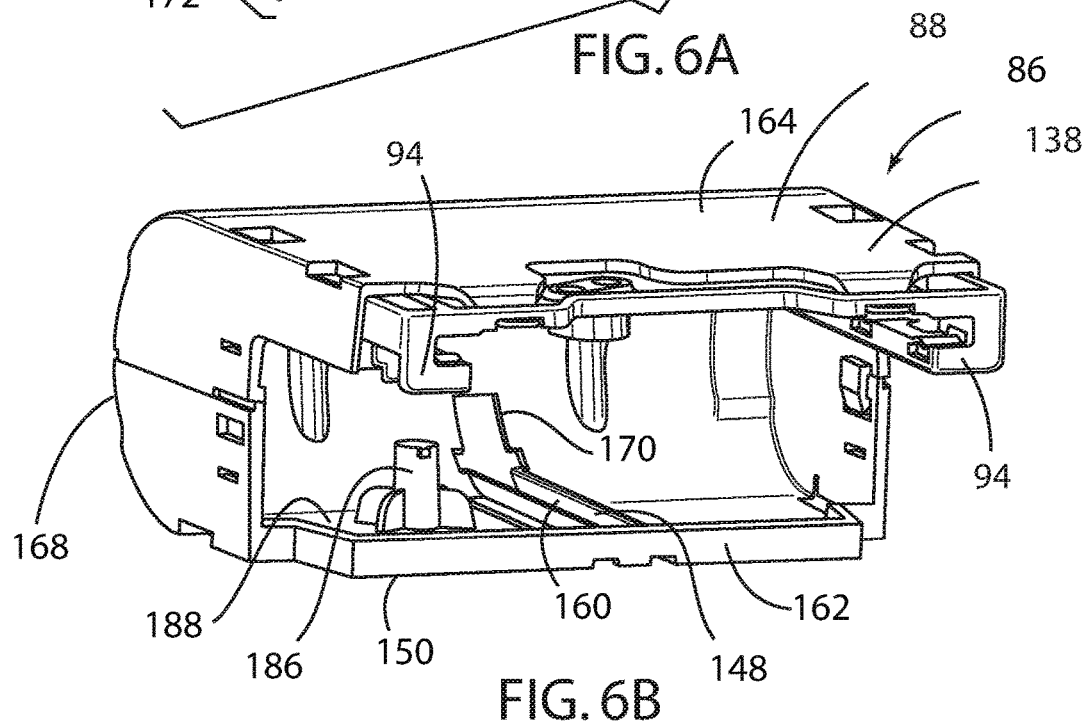
FIG. 6B is a perspective rear and side view of the movable housing of the extendable member of the leg supports of the lower seat of the vehicle seating assembly of FIG. 2.
Figure 11:
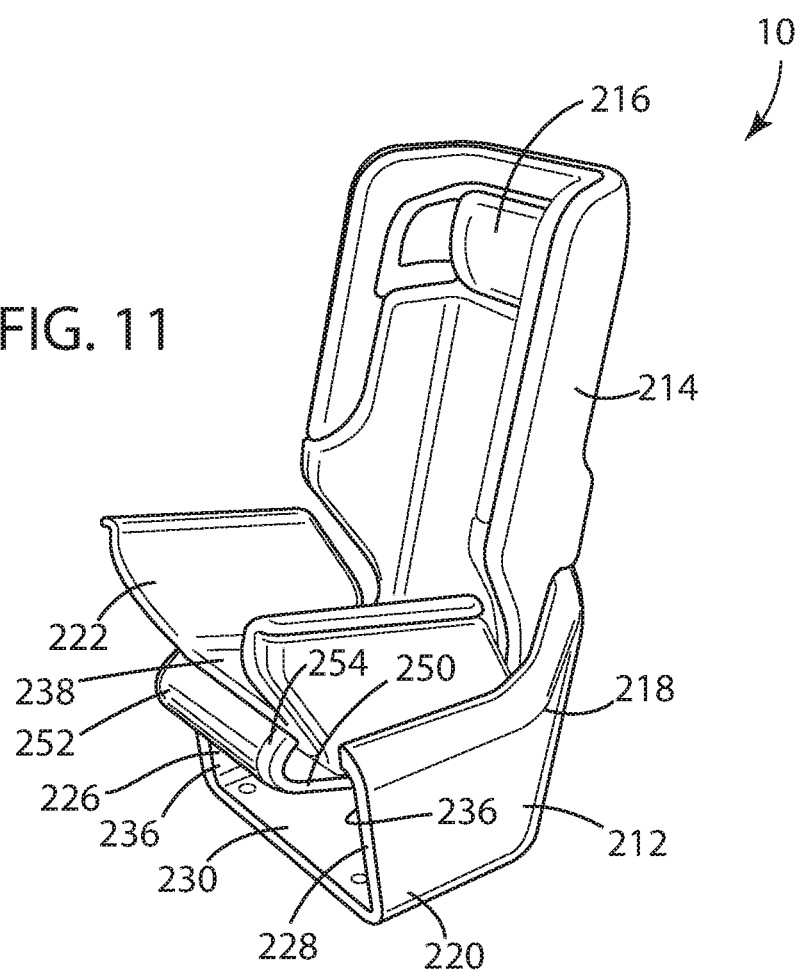
FIG. 11 is a perspective view of an another embodiment of a motor vehicle seating assembly of the present disclosure.
Figure 14:
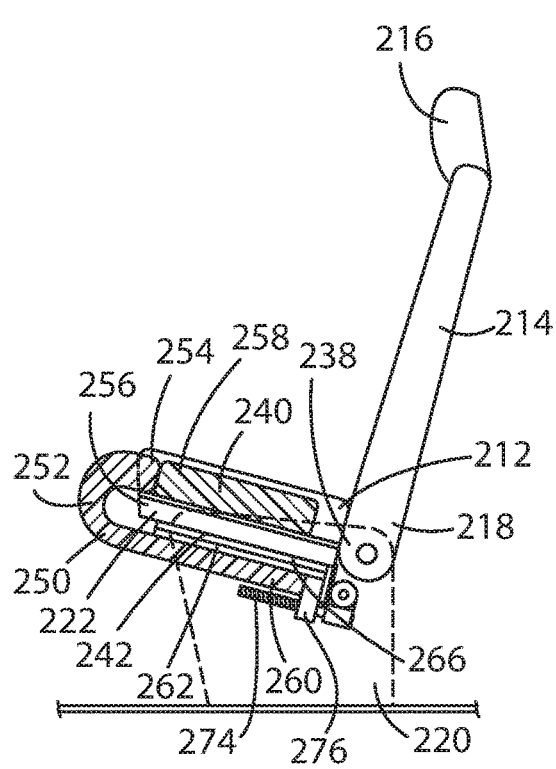
FIG. 14 is an enlarged partial, cross-sectional side view of the motor vehicle seating assembly of FIG. 11, wherein the nose of the lower seat assembly cushion is in the retracted position.
Figure 15:
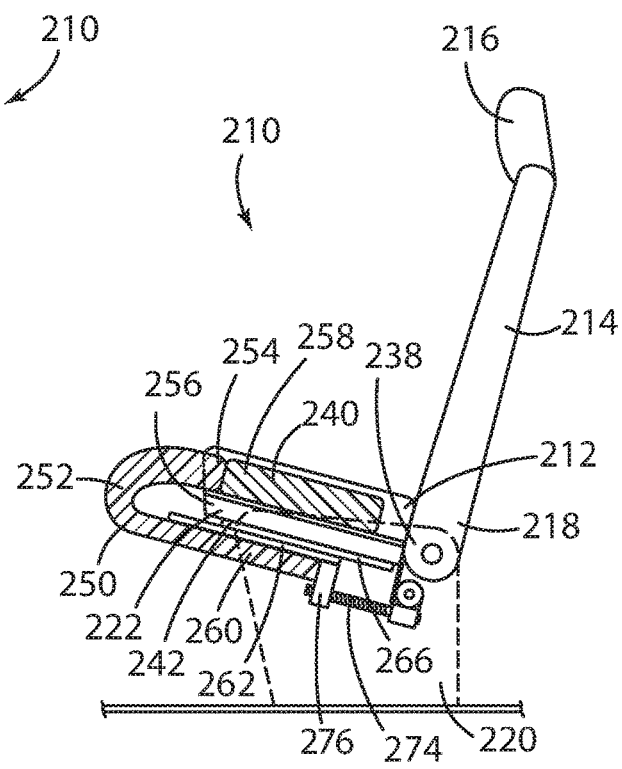
FIG. 15 is an enlarged partial, cross-sectional side view of the motor vehicle seating assembly of FIG. 11, wherein the nose of the lower seat assembly cushion is in the extended position
Figure 16:
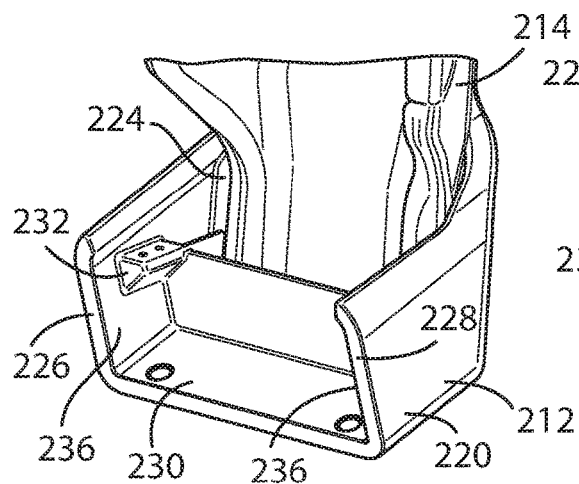
FIG. 16 is a perspective view of the seat base of the seat frame of the lower seat of the motor vehicle seating assembly of FIG. 11.
Figure 17:
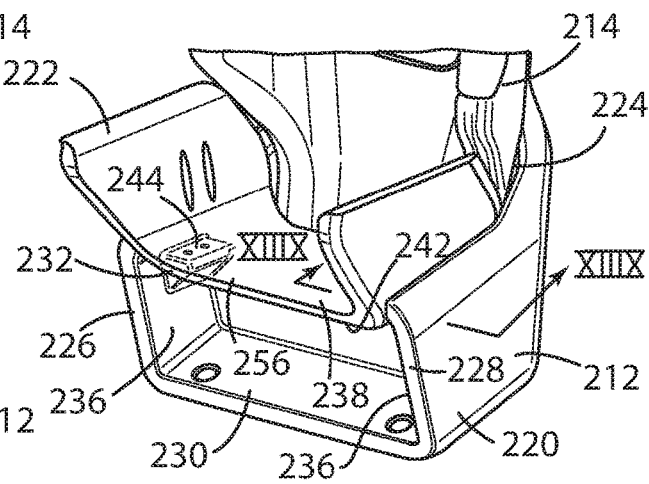
FIG. 17 is a perspective view of the assembled seat base and seat cushion base of the seat frame of the lower seat of the motor vehicle seating assembly of FIG. 11.
Figure 18:
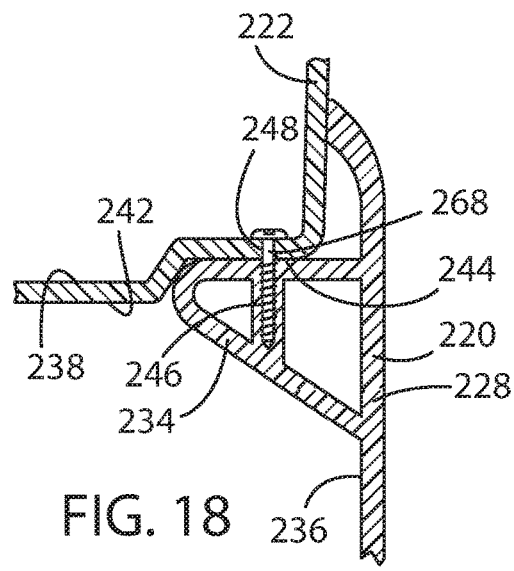
FIG. 18 is a cross-sectional view of the interface of the assembled seat base and seat cushion base of the seat frame of the lower seat of the motor vehicle seating assembly of FIG. 11.
Figure 19:
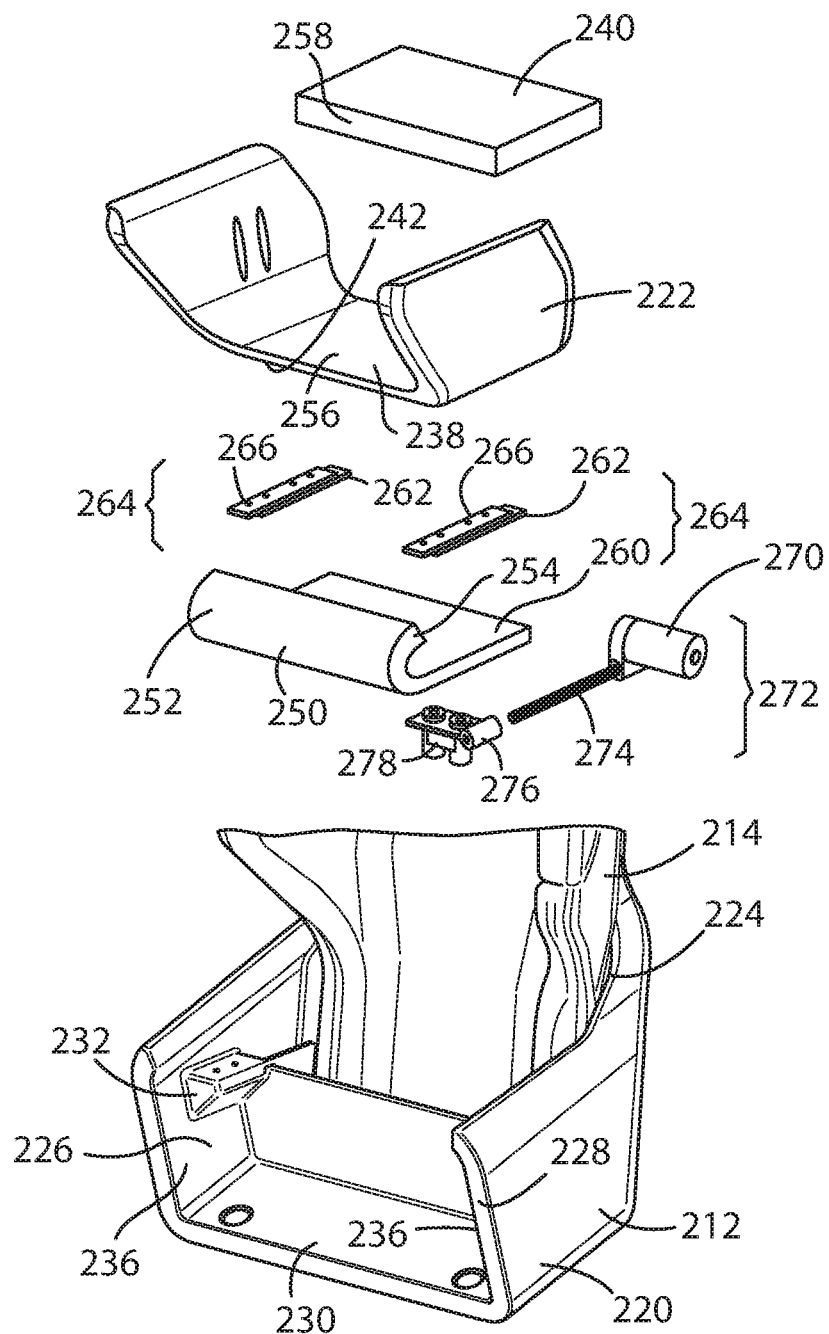
FIG. 19 is an exploded perspective view of the lower seat assembly of the motor vehicle seating assembly of FIG. 11.

Preferably, the linkage system employs a first fixed pivot 176 disposed within the cavity within the movable housing 74, 88. The first fixed pivot 176 is preferably mounted to the support base 60, 62 proximate an outer edge 178 of the movable housing 74, 88. The first fixed pivot 176 may be integrally formed as part of the support base 60, 62 as an extending boss or, preferably, as a separate bracket 179 may be fixedly attached to a forward portion 180 of the support base 60, 62. A second displaceable pivot 182 is disposed within the cavity and is preferably mounted to an upper portion 184 of the trim payout slider 152 proximate the lateral center of the movable housing 74, 88. A third fixed pivot 186 is disposed within the cavity and is mounted to an interior surface 188 of the lower clamshell 162 of movable housings 74, 88 intermediate the first and second pivots. Preferably, the third fixed pivot 186 is formed as a molded boss into the interior surface 188 of the lower clamshell 162 of the movable housing 74, 88, as best shown in FIG. 6B.

The linkage system also includes a pivot bracket 190 having a first end pivotably coupled with the first fixed pivot 176, the second displaceable pivot 182, and the third fixed pivot 186. That is, the pivot bracket 190 is pivotally connected at a first end 192 to the first fixed pivot 176 mounted to the support base 60, 62 via an opening 194 having a diameter that rotatably accepts the diameter of the first fixed pivot 176. The pivot bracket 190 is also pivotally connected at a second end 196 to the second displaceable pivot 182 mounted to trim payout slider 152 via an elongated end slot 198 extending longitudinally within a portion of the pivot bracket 190. The end slot 198 has a width that rotatably accepts the diameter of the second displaceable pivot 182. The second displaceable pivot 182 on the trim payout slider 152 is thereby operably coupled with the movable lower edge 142 of the trim cover stock 132 via the attachment member 146, as described above. The pivot bracket 190 further has an intermediate slot 200 disposed intermediate the first and second ends 192, 196 of the pivot bracket 190. The intermediate slot 200 also extends longitudinally within a portion of the pivot bracket 190. The intermediate slot 200 likewise has a width that rotatably accepts the diameter of the third fixed pivot 186. The intermediate slot 200 is thereby pivotably coupled with and engaged by the third fixed pivot 186 disposed within the cavity and mounted to the interior surface 188 of the movable housing 74, 88 intermediate the first and second ends 192, 196 of the pivot bracket 190.

With the second end 196 of the pivot bracket 190 coupled with and engaging the trim payout slider 152, where the end slot 198 is pivotably coupled with the second displaceable pivot 182 on the trim payout slider 152 and the intermediate slot 200 is pivotably coupled with the third fixed pivot 186 on the movable housings 74, 88, extension of either of the first or second extendable members 20, 22 from the retracted position to the extended position inherently moves the third fixed pivot 186 mounted on the interior surface 188 of the movable housing 74, 88 forward within the intermediate slot 200 and thereby urges the pivot bracket 190 forward. The end slot 198 pivotably coupled with the second displaceable pivot 182 mounted on the trim payout slider 152 is thereby urged forward along the integrated track 148, as is the attachment member 146 and the second movable lower edge 142 of the cover stock 132, as shown in FIGS. 10A-10C. Retraction of either of the first or second extendable members 26, 28 from the extended position to the retracted position moves the third fixed pivot 186 rearward within the intermediate slot 200 and thereby urges the pivot bracket 190 rearward, whereupon the end slot 198 pivotably coupled with the second displaceable pivot 182 mounted on the trim payout slider 152 urges the trim payout slider 152 rearward within the integrated track 148, along with the attachment member 146 and the second movable lower edge 142 of the cover stock 132, as shown in FIGS. 10A-10C.

Thus, as the trim payout slider 152 is moved forward and rearward, the operably coupled trim payout attachment member 146 and the second movable lower edge 142 of the cover stock 132 are moved forward and rearward. Preferably, the longitudinal displacement of the second movable lower edge 142 of the cover stock 132, as well as the trim payout slider 152 and attachment member 146, between the extended position and the retracted position of the extendable member position is about twice the longitudinal displacement of the movable housing 74, 88 of the extendable members 26, 28 between the extended position and the retracted position. That is, as best shown in FIGS. 7A and 7B, the distance $X^1$-X is about twice the distance $Y^1$-Y.

Notably, the first and second leg supports 20, 22 may be at the lowered position, the raised position, or any position there between simultaneously. However, the first and second leg supports 20, 22 may also be placed at different positions. For example, the first leg support 20 may be at the lowered position, while the second leg support 22 may be at the raised position. Moreover, at the same time, regardless of the raised or lowered positions of the first and second leg supports 20, 22, the first and second leg supports 20, 22 may also be at the extended or retracted positions. Again, the first and second leg supports 20, 22 may be placed at the retracted position or the extended position simultaneously. Alternatively, the first and second leg supports 20, 22 may be positioned differently. For example, the first leg support 20 may be at the lowered position and the retracted position, while the second leg support 22 may be at the extended position and the raised position.

As generally noted above, it will be understood that the first and second leg supports 20, 22 can be in the raised or lowered position, or any position there between, and at the same time, be in the extended or retracted position. Movement of the first and second leg supports 20, 22 between the raised and lowered positions is independent of movement of the first and second leg supports 20, 22 between the extended and retracted positions.

The vehicle seating assembly as disclosed herein includes first and second independently movable leg supports 20, 22 configured to provide independent support to the legs of a driver or passenger. For example, for a driver, frequently, the right leg of the driver is in an extended position to actuate the pedals. At the same time, particularly in vehicles equipped with an automatic transmission that does not require the manipulation of a clutch pedal, the left leg of the driver may be retracted to provide comfort to the driver. The vehicle seating assembly 10 as disclosed herein can allow for additional support under the right leg of the driver, thereby minimizing the likelihood that the endurance of the driver will wane over long trips. The vehicle seating 10 assembly as disclosed herein also provides additional comfort as the leg supports 20, 22 can be specifically moved and adjusted to conform to the preferred seating style of a particular driver or passenger.

As a further embodiment, reference numeral 210 generally designates another embodiment of a motor vehicle seating assembly for a motor vehicle 8 having a lower seat assembly 212 and an upwardly extending seat back assembly 214. The seat back assembly 214 preferably supports a headrest 216 thereon. The seat back assembly 214 is preferably pivotally coupled with the lower seat assembly 212, such that the seat back assembly 214 can be moved between upright and inclined positions relative the lower seat assembly 212. The headrest 216 is operably and, preferably, slidably connected with the seat back assembly 214 and is also positioned in a variety of positions and heights relative to the seat back assembly 214 to support the head and neck of a driver or a passenger.

Referring to FIGS. 11, 16, 17, and 19, the lower seat assembly 212 includes a seat frame 218 comprising a seat base 220 and a seat cushion base 222. The seat base 220 substantially defines an enclosure having a back wall 224 and a pair of lateral walls 226, 228 extending forward of and orthogonally to the back wall 224. The seat base 220 may include a lower wall or brace 230 by which the motor vehicle seating assembly 210 may be mounted to the structure of the motor vehicle. The seat base 220 may further comprise a pair of symmetrically configured and laterally displaced mounting ears 232, 234 disposed on an interior surface 236 of each of the pair of lateral walls 226, 228. The mounting ears 232, 234 project into an interior of the enclosure of the seat base 220. As shown, it should be understood that the seat frame 218, and its components thereof, may be fabricated via injection molding processes and may be constructed of polymer resins in order to obtain the geometries depicted.

The seat cushion base 222 of the seat frame 218 has an upper surface 238 upon which a stationary padded seat 240 is provided and upon which the motor vehicle driver or passenger may be seated. The seat cushion base 222 also has a bottom surface 242 on which a pair of laterally displaced attachment surfaces 44 is disposed. As shown in FIGS. 16, 17, 18, and 19, the seat cushion base 222 may be supported by the laterally displaced attachment surfaces 244 disposed on the bottom surface 242 thereof. Each laterally displaced attachment surface 244 is attached to one of the pair of laterally displaced mounting ears 232, 234. Preferably, each of the pair of laterally displaced mounting ears 232, 234 and the laterally displaced attachment surfaces 244 comprise aligned attachment holes 246, 248, respectively, for attachment of the seat cushion base 222 to the seat base 220 via a fastener 268.

The motor vehicle seating assembly 210 also includes a displaceable cushion 250 that may be actuated between an extended position and a retracted position. As is particularly shown in FIGS. 12-15, a forward projecting edge or displaceable cushion nose 252 of the displaceable cushion 250 is substantially U-shaped in each of the extended and the retracted positions and all positions there between. The displaceable cushion 250 preferably is constructed from a flexible material provided with an outer surface comprised of trim cover stock that matches the trim stock covering the stationary padded seat 240.

The displaceable cushion 250 has a first end 254 that is preferably attached to the upper surface 238 of a forward portion 256 of the seat cushion base 222 of the seat frame 218. Preferably, the first end 254 of the displaceable cushion 250 and a first end 258 of the stationary padded seat 240 are in juxtaposed and abutting relation as the displaceable cushion 250 is operated between the extended and retracted positions, thus preserving an aesthetically pleasing and generally continuous upper surface 238 of the lower seat assembly 212 at all times. The first end 254 of the displaceable cushion 250 may be attached to the upper surface 238 of the seat cushion base 222 by any number of methods, including adhesives, J-retainer attachments, threaded fasteners, etc., as will be appreciated by those having skilled in the art.

A second end 260 of the displaceable cushion 250 is operably coupled with a first slidable member 262, which comprises one of a pair of telescoping rails of a rail assembly 264. Preferably, the first slidable member 262 is fixedly attached to the second end 260 of the displaceable cushion 250, as noted above and as will be apparent to those having skill in the art. The first slidable member 262 is in turn coupled with a second slidable member 266, which comprises a second of the pair of telescoping rails of the rail assembly 264, which is operably coupled with the seat frame 218. The first slidable member 262 is preferably slidably disposed relative the second slidable member 266. Further, the second slidable member 266 is operably coupled with the bottom surface 242 of the seat cushion base 222 of the seat frame 218, and is preferably fixedly attached thereto by fasteners or other such similar devices. The rail assembly 264 is preferably sized to be robust enough to support the load of the driver or passenger seated in the motor vehicle seating assembly 210, as well as to maintain alignment of the components during operation.

In addition, the motor vehicle seating assembly 210 includes a motor 270 mounted beneath the seat cushion base 222. The motor may be mounted to the bottom surface 242 of the seat cushion base 222, the back wall 224 of the seat base 220, or any other such convenient location on the seat frame 218 that would allow the motor 270 to be fixedly attached to the seat frame 218. The motor 270 is preferably operably coupled with a drive mechanism 272 to operate the displaceable cushion 250 between the extended and retracted positions. The drive mechanism 272 preferably includes a threaded spindle 274 extending from and driven by the motor 270 operably disposed on the seat frame 218. A spindle nut 276 preferably threadingly receives the threaded spindle 274 and is operably coupled with the second end 260 of the displaceable cushion 250 via spindle nut coupler 278, whereby actuation of the motor 270 rotates the threaded spindle 274 to displace the spindle nut 276 and the second end 260 of the displaceable cushion 250 between a first position corresponding with the extended position of the cushion and a second position corresponding with the retracted position of the displaceable cushion 250.

Preferably, when the motor vehicle seating assembly is assembled and installed in the motor vehicle, each of the motor 270, threaded spindle 274, and spindle nut 276 are disposed beneath the seat cushion base 222 of the seat frame 218 and hidden from view from a position at the same level or above the motor vehicle seating assembly.

As described herein, a simple and unique method of moving a nose 252 of the displaceable cushion 250 is disclosed. A motor 270 is mounted underneath the seat cushion base 222, which turns a threaded spindle 274. A first end 254 of a flexible, U-shaped, and displaceable cushion 250 is mounted to a forward portion 256 of the seat cushion base 222. The threaded spindle 274 is connected to a spindle nut 276 mounted to a second end 260 of the displaceable cushion 250, which is likewise partially tucked under the seat cushion base 222. Operating the motor 270 turns the threaded spindle 274, which pushes or pulls on the spindle nut 276 and the second end 260 of the displaceable cushion 250, which in turn lengthens the cushion nose 252 extending forward in the motor vehicle seating assembly 210 or shortens the cushion nose 252 extended forward in the motor vehicle seating assembly 210. The displaceable cushion 250 so extended and retracted is connected to the seat frame 218 with a rail assembly 264 to support the load of the motor vehicle driver or passenger seated in the motor vehicle seating assembly 210. The rail assembly 264 also maintains alignment of the components during operation.

A major advantage of present disclosure is its simplicity of operation. Due to the "rolling" function of the combination of the displaceable cushion 250 and the stationary padded seat 240, which preferentially combine to form a substantially continuous and stationary horizontal seating surface, the extension of the cushion nose 252 is obtained exclusively via the U-shaped displaceable cushion 250. Thus, only one dimension of travel is required. Further, the present disclosure provides a device with a limited number of components, with the inherent advantages such limited number of components provides.

Finally, the device of the present disclosure provides a finer control of the displacement of the nose 252 of the displaceable cushion 250. Such finer control is a result of the fixed mechanical connection of the first end 254 of the displaceable cushion 50 with the forward portion 256 of the seat cushion base 222 and the displaceable mechanical connection of the second end 260 of the displaceable cushion 250 with the spindle nut 276, which combine to create a 2:1 mechanical advantage. For example, in order to extend the displaceable cushion nose 252 forward one inch, the spindle nut 276 attached to the second end 260 of the displaceable cushion 250 must advance two inches. This mechanical advantage also allows a less powerful motor to be used, saving on the weight and cost of the motor.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" or "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "connected" or "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A motor vehicle seating assembly comprising:
    a seat frame comprising a seat base and a seat cushion base, wherein the seat base comprises an enclosure having a back wall and a pair of lateral walls extending forward of and orthogonally to the back wall, and the seat base further comprises a pair of laterally displaced mounting ears disposed on an interior surface of each of the pair of lateral walls and projecting into an interior of the enclosure of the seat base;
    a flexible cushion fixedly attached at a first end thereof to the seat frame, wherein the first end of the cushion is fixedly attached to a forward portion of the seat cushion base, the seat cushion base further comprises a pair of laterally displaced attachment surfaces disposed on a bottom surface of the seat cushion base, and the seat cushion base is supported by the laterally displaced attachment surfaces, each of which is attached to one of the pair of laterally displaced mounting ears; and
    a motor disposed on the seat frame and operably coupled with a displaceable second end of the cushion, wherein actuation of the motor operates the cushion between an extended position and a retracted position.

2. The vehicle assembly of claim 1, further comprising:
    a rail operably coupled with the second end of the cushion and the seat frame; and
    a drive mechanism comprising a threaded spindle extending from and driven by the motor operably disposed on the seat frame, and a spindle nut threadingly receiving the threaded spindle and operably coupled with the second end of the cushion, whereby actuation of the motor rotates the threaded spindle to displace the spindle nut and the second end of the cushion between a first position corresponding with the extended position of the cushion and a second position corresponding with the retracted position of the cushion.

3. The motor vehicle seating assembly of claim 1, wherein each of the pair of laterally displaced mounting ears and the laterally displaced attachment surfaces comprise aligned attachment holes for attachment of the seat cushion base to the seat base.

4. The motor vehicle seating assembly of claim 1, wherein the seat base further comprises a lower wall by which the motor vehicle seating assembly is mounted to a motor vehicle structure.

5. The motor vehicle seating assembly of claim 1, wherein a forward projecting edge of the cushion is substantially U-shaped in each of the extended and the retracted positions and all position there between.

6. The motor vehicle seating assembly of claim 1, wherein the cushion further is comprised of a flexible material and has an outer surface comprised of trim cover stock.

7. A motor vehicle seating assembly comprising:
    a seat frame comprising a seat base and a seat cushion base, wherein the seat base comprises an enclosure having a back wall and a pair of lateral walls extending forward of and orthogonally to the back wall, and the seat base further comprises a pair of laterally displaced mounting ears disposed on an interior surface of each of the pair of lateral walls and projecting into an interior of the enclosure of the seat base;
    a displaceable cushion having a first end operably coupled with a forward portion of the seat frame and a second end operably coupled with the seat frame, wherein the first end of the cushion is fixedly attached to a forward portion of the seat cushion base, the seat cushion base further comprises a pair of laterally displaced attachment surfaces disposed on a bottom surface of the seat cushion base, and the seat cushion base is supported by the laterally displaced attachment surfaces, each of which is attached to one of the pair of laterally displaced mounting ears, and wherein the displaceable cushion is operable between an extended position and a retracted position;

a first slidable member operably coupled with the second end of the displaceable cushion;

a second slidable member operably coupled to the first slidable member and operably coupled to a bottom surface of the seat frame, wherein the first slidable member is slidably disposed relative the second slidable member;

a motor operably coupled with the second end of the displaceable cushion and the seat frame; and a drive mechanism operatively coupling the motor with the second end of the displaceable cushion, wherein actuation of the motor operates the displaceable cushion between the extended and retracted positions.

8. The motor vehicle seating assembly of claim 7, wherein the drive mechanism comprises a threaded spindle extending from and driven by the motor operably coupled with the seat frame and a spindle nut threadingly receiving the threaded spindle and operably coupled with the second end of the displaceable cushion, whereby actuation of the motor rotates the threaded spindle to displace the spindle nut and the second end of the displaceable cushion to operate the cushion between the extended and retracted positions.

9. The motor vehicle seating assembly of claim 8, wherein the motor, threaded spindle, and spindle nut are disposed beneath the seat frame and hidden from view from a position at the same level or above the motor vehicle seating assembly.

10. The motor vehicle seating assembly of claim 8, wherein the seat frame comprises a seat base and a seat cushion base and the seat cushion base has an upper surface upon which a stationary padded seat is supported and the seat cushion base further comprises the bottom surface to which the second slidable member is operably coupled.

11. The motor vehicle seating assembly of claim 7, wherein the first slidable member is fixedly attached to the second end of the cushion.

12. The motor vehicle seating assembly of claim 7, wherein the second slidable member is fixedly attached to the bottom surface of the seat frame.

13. The motor vehicle seating assembly of claim 7, wherein the first and second slidable members comprise a pair of telescoping rails.

14. The motor vehicle seating assembly of claim 7, wherein the motor is fixedly attached to the seat frame.

15. A motor vehicle seating assembly comprising:

a seat frame comprising a seat base and a seat cushion base, wherein the seat base comprises an enclosure having a back wall and a pair of lateral walls extending forward of and orthogonally to the back wall, and the seat base further comprises a pair of laterally displaced mounting ears disposed on an interior surface of each of the pair of lateral walls and projecting into an interior of the enclosure of the seat base, and wherein the seat cushion base has an upper surface upon which a stationary padded seat is supported and the seat cushion base further comprises a bottom surface;

a cushion attached at a first end to the seat frame, wherein the first end of the cushion is fixedly attached to a forward portion of the seat cushion base, the seat cushion base further comprises a pair of laterally displaced attachment surfaces disposed on the bottom surface of the seat cushion base, and the seat cushion base is supported by the laterally displaced attachment surfaces, each of which is attached to one of the pair of laterally displaced mounting ears;

a telescoping rail assembly operably coupled with a second end of the cushion and the seat frame; and a motor disposed on a the seat frame and operably coupled with the second end of the cushion, wherein actuation of the motor operates the cushion between an extended position and a retracted position.

16. The motor vehicle seating assembly of claim 15, wherein the first end of the cushion and a first end of the stationary padded seat are in juxtaposed and abutting relation as the cushion is operated between the extended and retracted positions.

* * * * *